(12) United States Patent
Unno

(10) Patent No.: US 9,575,395 B2
(45) Date of Patent: Feb. 21, 2017

(54) CEILING HANGER

(71) Applicant: SEIKO EPSON CORPORATION, Tokyo (JP)

(72) Inventor: Teruhiko Unno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 14/669,839

(22) Filed: Mar. 26, 2015

(65) Prior Publication Data

US 2015/0198284 A1 Jul. 16, 2015

Related U.S. Application Data

(63) Continuation of application No. 13/851,436, filed on Mar. 27, 2013, now Pat. No. 9,134,592.

(30) Foreign Application Priority Data

| Apr. 6, 2012 | (JP) | 2012-087132 |
| Apr. 6, 2012 | (JP) | 2012-087133 |
| Apr. 6, 2012 | (JP) | 2012-087134 |

(51) Int. Cl.

| E21F 17/02 | (2006.01) |
| G03B 21/14 | (2006.01) |
| F16M 7/00 | (2006.01) |
| F16M 11/10 | (2006.01) |
| F16M 11/20 | (2006.01) |
| F16M 13/02 | (2006.01) |
| H02G 3/30 | (2006.01) |

(52) U.S. Cl.
CPC ............... *G03B 21/14* (2013.01); *F16M 7/00* (2013.01); *F16M 11/105* (2013.01); *F16M 11/2014* (2013.01); *F16M 11/2021* (2013.01); *F16M 13/027* (2013.01); *H02G 3/30* (2013.01)

(58) Field of Classification Search
CPC ......... G03B 21/14; F16M 7/00; F16M 11/105; F16M 11/12; F16M 11/2035; F16M 11/2014; F16M 11/2021; F16M 13/027; H02G 3/30; A45F 5/08
USPC .................................................. 352/34, 243
See application file for complete search history.

(56) References Cited

U.S. PATENT DOCUMENTS

| 4,368,506 A | 1/1983 | Rapp |
| 5,376,020 A | 12/1994 | Jones |
| 5,490,655 A | 2/1996 | Bates |
| 5,551,658 A | 9/1996 | Dittmer |
| 5,938,161 A | 8/1999 | Takeuchi et al. |

(Continued)

FOREIGN PATENT DOCUMENTS

| JP | H03-061796 | 3/1991 |
| JP | 2004-347835 | 12/2004 |

(Continued)

*Primary Examiner* — Christopher E Garft
(74) *Attorney, Agent, or Firm* — Workman Nydegger

(57) ABSTRACT

A ceiling hanger includes: a first plate fixed to a ceiling surface; a second plate forming a first rotation axis in the up-down direction after fitted to the first plate, and allowing control in the horizontal direction; a third plate forming a second rotation axis in the front-rear direction after fitted to the second plate, and allowing control in the left-right direction; and a fourth plate fixing a projector, forming a third rotation axis in the left-right direction after fitted to the third plate, and allowing control in the up-down direction.

18 Claims, 12 Drawing Sheets

(56) References Cited

U.S. PATENT DOCUMENTS

| | | | |
|---|---|---|---|
| 6,485,144 B1* | 11/2002 | Liao | G03B 21/00 |
| | | | 348/151 |
| 6,606,887 B1* | 8/2003 | Zimmer | E05B 73/0082 |
| | | | 70/14 |
| 7,503,536 B2 | 3/2009 | Friederich et al. | |
| 8,573,551 B2 | 11/2013 | Hung | |
| 2004/0211872 A1* | 10/2004 | Dittmer | F16M 11/04 |
| | | | 248/323 |
| 2006/0186301 A1 | 8/2006 | Dozier et al. | |
| 2007/0257181 A1 | 11/2007 | Dittmer et al. | |
| 2008/0011912 A1* | 1/2008 | Liao | F16M 11/105 |
| | | | 248/125.2 |
| 2008/0061200 A1 | 3/2008 | Bouissiere | |
| 2009/0316118 A1 | 12/2009 | Dittmer | |
| 2010/0314513 A1* | 12/2010 | Evans | F16M 11/08 |
| | | | 248/217.4 |
| 2010/0321646 A1* | 12/2010 | Nakano | G03B 21/14 |
| | | | 353/119 |
| 2011/0297809 A1 | 12/2011 | Bouissiere et al. | |
| 2012/0056057 A1* | 3/2012 | Huang | F16M 11/12 |
| | | | 248/288.11 |
| 2014/0077053 A1* | 3/2014 | Chang | G03B 21/145 |
| | | | 248/346.06 |
| 2014/0252189 A1* | 9/2014 | Kifer | F16M 11/10 |
| | | | 248/299.1 |

FOREIGN PATENT DOCUMENTS

| | | |
|---|---|---|
| JP | 2005-172935 | 6/2005 |
| JP | 10-2006-0058357 | 5/2006 |
| JP | 2008-076582 | 4/2008 |
| JP | 2009-204902 | 9/2009 |
| JP | 2010-079155 | 4/2010 |
| JP | 2011-013267 | 1/2011 |
| JP | 2012-032466 | 2/2012 |

* cited by examiner

CEILING HANGER

CROSS-REFERENCE TO RELATED APPLICATIONS

The present application is a Continuation of U.S. patent application Ser. No. 13/851,436 filed on Mar. 27, 2013, which claims priority to Japanese Patent Application No. 2012-087132, filed on Apr. 6, 2012, Japanese Patent Application No. 2012-087133, filed on Apr. 6, 2012, and Japanese Patent Application No. 2012-087134, filed on Apr. 6, 2012, which applications are incorporated herein by reference in their entirety.

BACKGROUND

1. Technical Field

The present invention relates to a ceiling hanger for a projector.

2. Related Art

A ceiling hanger for a projector known in the art is positioned on a ceiling or other places to fix a projector thereto. The projector thus fixed connects to various types of cables for connection with an image device, a personal computer, a network or the like. This structure allows the projector to project an image inputted through the cable onto a screen placed on a wall surface, a standing-type screen or others.

This type of ceiling hanger, including the cable, is designed to become inconspicuous so as to meet the demands for inconspicuousness of the ceiling hanger from the market or for other reasons. Therefore, the ceiling hanger is so configured as to allow attachment of the projector as close to the ceiling surface as possible, with the cable wired in the least visible manner from the outside, so as to improve the external appearance.

There is disclosed in JP-A-2005-172935 a fixing device for a video projector, that includes a fix side member attachable to a support body which fixes and supports a video projector, and a main body side member to which the main body of the video projector is attached, and changes the attachment posture of the main body side member with respect to the fix side member by using a posture change mechanism provided between the fix side member and the main body side member before fixing the video projector. The posture change mechanism contains a ball connected and fixed to either the fix side member or the main body member, a pressed member connected and fixed to the other of the fix side member and the main body member, and a pressing member which presses the ball against the pressed member to fix the ball, and further has an operation lever operated to press the pressing member.

There is disclosed in JP-A-2011-13267, a ceiling hanger which includes a first board provided with a pair of guides and a pair of first holding units disposed at the ends of the guides, and a second board which supports a projector and has a first holding member fitted to areas near both the ends of the guides and sliding with respect to the guides in such a manner as to be rotatably supported by the first holding units.

There is disclosed in 2004-347835, a hanger which includes a unit having legs disposed at the left and right front ends of the main body bottom of the unit to control the height of the hanger placed on a table, and a hanger metal fitting which hangs the unit from a ceiling. The hanger metal fitting has insertion portions at the left and right front ends, and support portions at the left and right rear ends. At the time of hanging from a ceiling, the hanger metal fitting is attached to the ceiling, and the legs are inserted into the insertion portions. In this condition, the right and left rear ends of the main body bottom are positioned in such a manner as to be rotatably supported by the support portions, and the depression angle is controlled by adjustment of the legs.

There is disclosed in JP-A-2009-204902, a projector ceiling hanger which includes a ceiling side fixing member attached to a ceiling, a projector side fixing member attached to a projector, a connection member connecting the ceiling side fixing member and the projector side fixing member, and a direction/posture control unit which controls the direction and posture of the projector.

According to the fixing device for a video projector in JP-A-2005-172935 which controls the position of the projector by using the ball, however, fine adjustment of the position is difficult. Moreover, at the time of fixation of the ball using the operation lever after the control, the controlled position easily shifts, in which case a projection image moves accordingly. In the case of the ceiling hanger disclosed in JP-A-2011-13267, three axes of the horizontal direction, the roll direction (left-right direction), and the up-down direction are adjustable. According to this structure, however, the position control of the projector, and the fixation of the projector by fastening screws after the control are both carried out while holding the projector by hand. In this case, time and labor are required for the control, and fine adjustment becomes difficult. According to the hanger disclosed in 2004-347835, the depression angle of the unit is controlled by using the legs for height control. However, this hanger is exclusively used for devices provided with legs for height control, and therefore offers low flexibility. Moreover, this hanger controls only one axis (depression angle), and cannot adjust a larger number of control axes.

Furthermore, the fixing device shown in JP-A-2005-172935 and the ceiling hanger shown in JP-A-2011-13267 do not clarify the storage channel of the cable. In this case, there is a possibility that the whole cable is exposed to the outside in the space between the ceiling (ceiling surface) and the projector. In addition, the components constituting the fixing device or the ceiling hanger are exposed to the outside. Accordingly, the external appearance of the fixing device or the ceiling hanger becomes undesirable when the device is used at home or installed in offices, for example.

The ceiling hanger disclosed in JP-A-2009-204902 has a hollow area inside a pipe-shaped portion of the connection member. The inside of the pipe-shaped portion corresponds to the wiring channel of the cable. However, when the inside diameter of the pipe-shaped portion is decreased for the purpose of reduction of the thickness of the ceiling hanger or for other reasons, insertion of a plurality of cables becomes difficult.

Moreover, according to the ceiling hanger shown in JP-A-2009-204902, the components constituting the ceiling hanger are exposed to the outside similarly to the devices shown in JP-A-2005-172935 and JP-A-2011-13267. Therefore, the external appearance of the ceiling hanger similarly becomes undesirable when the ceiling hanger is used at home or installed in offices. In addition, dust adheres to the components constituting the ceiling hanger when the components are exposed to the outside. In this case, there arises not only the problem of the deteriorated appearance but also the problem of difficult removal of the adhering dust.

Accordingly, such a ceiling hanger has been demanded which can easily and securely achieve fine adjustment of the position (posture) of the projector in the horizontal direction, left-right direction, and up-down direction, can save the space required for attachment and detachment of the projector, and can reduce the thickness of the projector. In addition, such a ceiling hanger capable of improving the external appearance including the cable wiring has also been demanded.

SUMMARY

An advantage of some aspects of the invention is to solve at least a part of the aforementioned problems, and the invention can be implemented as the following modes or application examples.

Application Example 1

This application example is directed to a ceiling hanger for a projector, including (a) a first plate fixed to a ceiling surface, (b) a second plate positioned on the ceiling surface together with the first plate, forming a first rotation axis having a rotation axis in the up-down direction after fitted to the first plate, and allowing control in the horizontal direction around the first rotation axis, (c) a third plate forming a second rotation axis having a rotation axis in the front-rear direction after fitted to the second plate, and allowing control in the left-right direction around the second rotation axis, and (d) a fourth plate fixing the projector, forming a third rotation axis having a rotation axis in the left-right direction after fitted to the third plate, and allowing control in the up-down direction around the third rotation axis.

The ceiling hanger having this structure has the four plates constituted by the first plate through the fourth plate, and locates the projector on the ceiling surface. The first plate and the second plate are positioned on the ceiling surface. The second plate makes adjustment in the horizontal direction around the first rotation axis having a rotation axis in the up-down direction produced when the second plate is fitted to the first plate. The third plate makes adjustment in the left-right direction around the second rotation axis having a rotation axis in the front-rear direction and produced when the third plate is fitted to the second plate. The fourth plate fixes the projector and makes adjustment in the up-down direction around the third rotation axis having a rotation axis in the left-right direction and produced when the fourth plate is fitted to the third plate.

According to this structure, the ceiling hanger constituted by the four plates of the first plate through the fourth plate fitted to each other has a small thickness. Moreover, the adjustment in the horizontal direction is achieved by the engagement between the first plate and the second plate, the adjustment in the left-right direction is achieved by the engagement between the second plate and the third plate, and the adjustment in the up-down direction is achieved by the engagement between the third plate and the fourth plate. Accordingly, fine adjustment of the position (posture) of the projector in the horizontal direction, left-right direction, and up-down direction can be easily and securely made.

Application Example 2

It is preferable that the ceiling hanger according the above application example is configured such that the first plate has either one of a cylindrical portion and an opening which receives insertion of the cylindrical portion and slides on the outer circumference of the cylindrical portion; the second plate has the other of the cylindrical portion and the opening; and the first plate and the second plate having one and the other of the cylindrical portion and the opening, respectively, produce the first rotation axis.

According to the ceiling hanger having this structure, the first plate has either one of the cylindrical portion and the opening, while the second plate has the other of the cylindrical portion and the opening, so that the first rotation axis can be produced by the first plate and the second plate. Thus, the first rotation axis can be easily established.

Application Example 3

It is preferable that the ceiling hanger according to the above application example is configured such that the third plate produces the second rotation axis by engagement with the second plate via a screw member.

According to the ceiling hanger having this structure, the third plate produces the second rotation axis by engagement with the second plate via the screw member. Thus, the second rotation axis can be easily established.

Application Example 4

It is preferable that the ceiling hanger according to the above application example is configured such that the third plate has either one of a support shaft provided in the left-right direction and a holding portion holding the support shaft; the fourth plate has the other of the support shaft and the holding portion; and the third plate and the fourth plate having one and the other of the support shaft and the holding portion, respectively, produce the third rotation axis.

According to the ceiling hanger having this structure, the third plate and the fourth plate have one and the other of the support shaft and the holding portion, respectively, and produce the third rotation axis. Thus, the third rotation axis can be easily produced. Moreover, the fourth plate to which the projector is fixed, for example, can be easily and securely held on the third plate by having the support shaft be held on the holding portion. Also, the fourth plate can be easily and securely removed from the third plate.

Application Example 5

It is preferable that the ceiling hanger according to the above application example is configured such that either one of the third plate and the fourth plate having the holding portion has a guide which guides the support shaft toward the holding portion.

According to the ceiling hanger having this structure, the support shaft can be guided to the holding portion by using the guide, wherefore the support shaft can be further easily and securely held by the holding portion.

Application Example 6

It is preferable that the ceiling hanger according to the above application example is configured such that either one of the third plate and the fourth plate having the holding portion has an opening through which the position of the support shaft supported by the holding portion can be recognized.

According to the ceiling hanger having this structure, when the ceiling hanger is of a thin type having a short clearance between the ceiling surface and the projector, the step for disposing the support shaft provided on the fourth plate to which the projector is fixed such that the support shaft is carried on the holding portion provided on the third plate, for example, is performed in a blind manner. However, this blind step can be executed with easy checking of whether the support shaft is located at an appropriate position of the holding portion through the opening formed on the plate (third plate, for example) provided with the holding portion. Thus, it can be visually checked whether the support shaft is held on the holding portion in an appropriate manner even when the step for disposing the support shaft on the holding portion is performed blindly. Accordingly, the projector can be securely held on the holding portion, wherefore the safety of the ceiling hanger increases.

Application Example 7

It is preferable that the ceiling hanger according to the above application example is configured such that either one of the first plate and the second plate has a first screw member disposed substantially perpendicular to the first rotation axis; and the control in the horizontal direction is carried out by rotating the first screw member provided on the one plate in abutment with the other plate.

According to the ceiling hanger having this structure, the control in the horizontal direction is performed by rotating the first screw member provided on the one plate around the first rotation axis in abutment with the other plate. Thus, fine adjustment in the horizontal direction can be made by controlling the volume of rotation of the first screw member. Moreover, the abutment between the first screw member and the other plate can achieve fixation while preventing positional shift after the adjustment.

Application Example 8

It is preferable that the ceiling hanger according to the above application example is configured such that either one of the second plate and the third plate has a second screw member provided in the left-right direction with the center located on the second rotation axis, and positioned substantially perpendicular to the second rotation axis; and the control in the left-right direction is carried out by rotating the second screw member provided on the one plate in abutment with the other plate.

According to the ceiling hanger having this structure, the control in the left-right direction is performed by rotating the second screw member provided on the one plate in the left-right direction around the second rotation axis in abutment with the other plate. Thus, fine adjustment in the left-right direction can be made by controlling the volume of rotation of the second screw member. Moreover, the abutment between the second screw member and the other plate can achieves fixation while preventing positional shift after the adjustment.

Application Example 9

It is preferable that the ceiling hanger according to the above application example is configured to further include a screw member which fixes the second plate and the third plate. In this case, either one of the second plate and the third plate has a screwing portion formed substantially in parallel with the second rotation axis and engaging with the screw member, and the other of the second plate and the third plate has a long hole formed concentrically around the second rotation axis and guiding the screw member.

According to the ceiling hanger having this structure, the third plate (or second plate) is rotated in the left-right direction with respect to the second plate (or third plate) by loosening the screw member at the time of adjustment in the left-right direction around the second rotation axis by using the second screw member. On the other hand, the second plate and the third plate are securely fixed to each other by tightening the screw member after completion of the adjustment in the left-right direction. Also, rough adjustment in the left-right direction before fine adjustment by the second screw member can be made by loosening the screw member. In addition, the abutment between the second screw member and the other plate allows the screw member to be easily fastened after completion of the adjustment without the necessity of caution for avoiding positional shift after the adjustment.

Application Example 10

It is preferable that the ceiling hanger according to the above application example is configured such that either one of the third plate and the fourth plate has a third screw member disposed substantially perpendicular to the third rotation axis; and the control in the up-down direction is carried out by rotating the third screw member provided on the one plate in abutment with the other plate.

According to the ceiling hanger having this structure, the control in the up-down direction is performed by rotating the third screw member provided on the one plate around the third rotation axis in abutment with the other plate. Thus, fine adjustment in the up-down direction can be made by controlling the volume of rotation of the third screw member. Moreover, the abutment between the third screw member and the other plate can achieve fixation while preventing positional shift after the adjustment.

Application Example 11

It is preferable that the ceiling hanger according to the above application example is configured to further include a screw member which fixes the third plate and the fourth plate. In this case, either one of the third plate and the fourth plate has a screwing portion formed substantially in parallel with the third rotation axis and engaging with the screw member, and the other of the third plate and the fourth plate has a long hole formed concentrically around the third rotation axis and guiding the screw member.

According to the ceiling hanger having this structure, the fourth plate (or third plate) is rotated in the up-down direction with respect to the third plate (or fourth plate) by loosening the screw member at the time of adjustment in the up-down direction around the third rotation axis by using the third screw member. On the other hand, the third plate and the fourth plate are securely fixed to each other by tightening the screw member after completion of the adjustment in the up-down direction. Also, rough adjustment in the up-down direction before fine adjustment by the third screw member can be made by loosening the screw member. In addition, the abutment between the third screw member and the other plate allows the screw member to be easily fastened after completion of the adjustment without the necessity of caution for preventing positional shift after the adjustment.

Application Example 12

It is preferable that the ceiling hanger according to the above application example is configured such that the first plate has either one of a cylindrical portion and a first opening which receives insertion of the cylindrical portion, the second plate has the other of the cylindrical portion and the first opening, so that the first plate and the second plate having one and the other of the cylindrical portion and the first opening, respectively, produce the first rotation axis; the third plate has a second opening in an area opposed to the first opening; and a cable connected with the projector is inserted through the cylindrical portion, the first opening, and the second opening.

According to the ceiling hanger having this structure, the cable is inserted into the cylindrical portion, the first opening, and the second opening, and connected with the projector. In this case, the cable passes through the interior of the ceiling hanger and connects with the projector with the lowest possible conspicuousness from the outside even when the thickness of the ceiling hanger is reduced. Thus, the external appearance of the wiring of the cable improves. Moreover, a plurality of the cable can be inserted by enlarging the diameters of the cylindrical portion, the first opening, and the second opening even when the thickness of the ceiling hanger is reduced.

Application Example 13

It is preferable that the ceiling hanger according to the above application example is configured such that the fourth plate has a clearance securing portion provided in the area where the cable is extended to secure a clearance between the fourth plate and the surroundings of the second opening in the height direction.

According to the ceiling hanger having this embodiment, the clearance securing portion for securing a sufficient distance from the area around the second opening in the height direction so as to allow the cable to be extended from the clearance securing portion. In this case, a plurality of cables can be guided toward the cable connection side of the projector, and connected with the projector with the minimum exposure along the shortest route. Thus, the external appearance of the wiring of the cable improves.

Application Example 14

It is preferable that the ceiling hanger according to the above application example is configured such that the second opening is disposed offset toward the area where the cable is extended.

According to the ceiling hanger having this structure, the second opening is disposed offset toward the side through which the cable is extended. Thus, the step for guiding the plural cables toward the cable connection side of the projector can be carried out with higher efficiency.

Application Example 15

It is preferable that the ceiling hanger according to the above application example is configured such that a cover member which covers the side surfaces of the first plate, the second plate, and the third plate is disposed between the ceiling surface and the projector fixed to the fourth plate.

According to the ceiling hanger having this structure, the cover member covers the side surfaces of the first plate, the second plate, and the third plate to avoid exposure of the first plate, the second plate, and the third plate to the outside. Thus, the external appearance of the ceiling hanger improves.

In addition, the cover member avoids exposure of the first plate, the second plate, and the third plate, thereby preventing adhesion of dust to the respective plates. This advantage contributes to maintenance of the external appearance and easy cleaning of the ceiling hanger.

Application Example 16

It is preferable that the ceiling hanger according to the above application example is configured such that the cover member is so sized as to avoid the movable range of the second plate, the third plate, and the fourth plate for the control.

According to the ceiling hanger having this structure, the cover member is so sized as to avoid the movable ranges of the second plate through the fourth plate when the respective plates move during control of the position (posture) of the projector in the horizontal direction, left-right direction, and up-down direction. Thus, the cover member can be positioned without collision with the respective plates after the adjustment. Accordingly, the respective plates can be made invisible even when shifted at the time of of the adjustment, wherefore the external appearance of the ceiling hanger improves.

Application Example 17

It is preferable that the ceiling hanger according the above application example is configured such that the cover member covers a component operated at the time of the control.

According to the ceiling hanger having this structure, the cover member covers the component operated for the adjustment, thereby making this component invisible. Thus, the external appearance of the ceiling hanger improves. Moreover, the cover member covering the component operated for the adjustment can reduce the number of parts easily caught. Thus, the ceiling hanger can be easily and safely cleaned.

Application Example 18

It is preferable that the ceiling hanger according to the above application example is configured such that any of the first plate through the fourth plate has a fixing portion which fixes the cover member; the cover member has a first cover covering the side surfaces on the front side, and a second cover covering the side surfaces on the rear side; and the first cover and the second cover are arranged in the left-right direction and fixed to the fixing portion.

According to the ceiling hanger having this structure, the cover member has the first cover covering the side surfaces on the front side, and the second cover covering the side surfaces on the rear side. The respective covers are fixed to the fixing portion in the left-right direction. In this case, the joint between the first cover and the second cover is located not on the front side or the rear side, but on the left or right side. Moreover, for fixing the respective covers to the fixing portion via screw members, for example, the positions of the screw members are also located in the left-right direction. Accordingly, the joint, the screw members and others which may deteriorate the external appearance are disposed in the left-right direction, wherefore the external appearance on the front side and the rear side can improve.

Application Example 19

It is preferable that the ceiling hanger according to the above application example is configured such that the cover member is made of synthetic resin.

According to the ceiling hanger in this embodiment, the cover member is made of synthetic resin. In this case, the processability of the cover member improves. In addition, the degree of freedom in designing the cover member increases.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be hereinafter described with reference to the drawings.

Embodiment

Figure 1A:
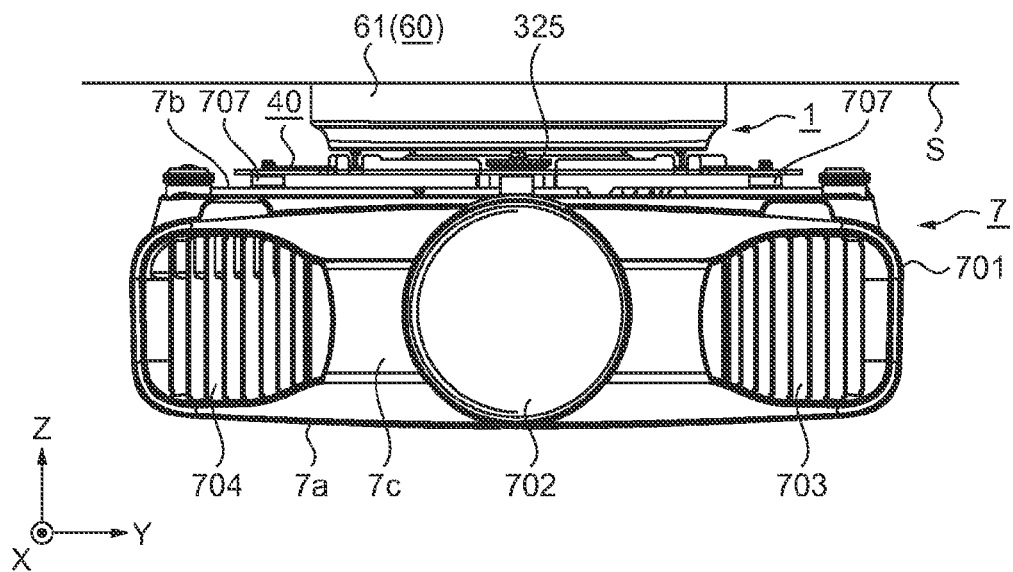
FIGS. 1A and 1B illustrate a projector fixed to a ceiling surface via a ceiling hanger according to an embodiment.
Figure 1B:
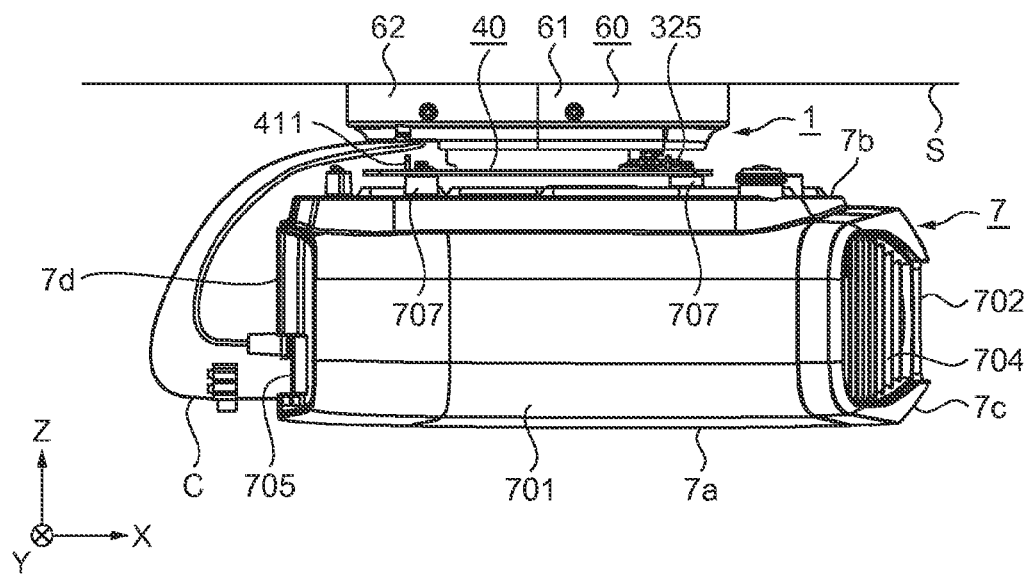

FIGS. 1A and 1B illustrate a condition of a projector 7 fixed to a ceiling surface S via a ceiling hanger 1 according to this embodiment. FIG. 1A is a front view of the ceiling hanger 1 as viewed from the front, while FIG. 1B is a side view of the ceiling hanger 1 as viewed from the left. The ceiling hanger 1 according to this embodiment is now explained with reference to FIGS. 1A and 1B.

As illustrated in FIGS. 1A and 1B, the ceiling hanger 1 in this embodiment is a device which suspends the projector 7 from the ceiling surface S. In addition, the ceiling hanger 1 is a device which controls the attachment position (posture) of the suspended projector 7 to align the position of a projected image with a predetermined position on a screen (not shown).

The projector 7 in this embodiment is an apparatus which modulates light flux emitted from a light source (not shown) by using light modulation elements (not shown) according to image signals to form an optical image, and projects the formed optical image to the screen or the like via a projection lens 702 as image light.

In the figures explaining this embodiment (FIGS. 1A and 1B and figures referred to below), the respective directions are determined as follows. Assuming that the normal direction of the ceiling surface S is a Z direction (up-down direction), the direction of gravity corresponds to the −Z direction (downward direction), while the direction opposite to the direction of gravity corresponds to the +Z direction (upward direction). Assuming that the direction crossing the Z direction at right angles and agreeing with the direction in which the projection lens 702 of the projector 7 projects image light is an X direction (front-rear direction), the direction toward the installation position of the screen corresponds to the +X direction (front direction), while the direction opposite to the +X direction corresponds to the −X direction (rear direction). Assuming that the direction crossing the Z direction (up-down direction) and the X direction (front-rear direction) at right angles is a Y direction (left-right direction), the leftward direction as viewed in the direction facing to the front of the projector 7 shown in FIG. 1A corresponds to the −Y direction (left direction), while the rightward direction as viewed in the same manner as in the −Y direction corresponds to the +Y direction (right direction). The reference signs X (front-rear), Y (left-right), and Z (up-down) representing the respective directions are used where appropriate in the following description.

The projector 7 is covered by an external housing 701 having a substantially rectangular parallelepiped shape. The external housing 701 contains an optical unit (not shown) accommodating the light modulation elements and the like noted above, a circuit structure unit (not shown) including a control unit for controlling the operation of the projector 7, and other components.

At the time of attachment to the ceiling surface S (hanging from the ceiling), the projector 7 is positioned on the ceiling hanger 1 with an upper surface 7a and a lower surface 7b of the projector 7 placed in the reversed position with respect to the position placed on a desk surface. More specifically, the projector 7 is fixed to the ceiling hanger 1 with the lower surface 7b located on the upper side (upper surface 7a on the lower side), and with hanging legs 707 on the lower surface 7b fixed to a fourth plate 40 of the ceiling hanger 1 by screws. The ceiling hanger 1 holds and fixes a portion around the center of the lower surface 7b of the projector 7.

A switch unit (not shown) through which operation is inputted and other components are provided on the upper surface 7a of the projector 7. The projection lens 702 is equipped at the center of a front surface 7c of the projector 7. Image light emitted from the projection lens 702 is projected onto the screen disposed on the front side.

An air intake port 703 is formed on the right side of the projection lens 702 as viewed when the projector 7 is suspended from the ceiling, while an air discharge port 704 is formed on the left side. Signal receivers (not shown) which receive operation signals from a remote controller are disposed on the front surface 7c and a rear surface 7d. An interface 705 to which various types of cables C are connected is provided on the rear surface 7d of the projector 7.

According to this embodiment, the respective cables C to be connected with the interface 705 extend through the interior of the ceiling and pass through an opening (not shown) formed in the ceiling surface S to the outside, hanging in the downward direction (−Z direction) before attachment of the ceiling hanger 1. Under this condition, the ceiling hanger 1 is installed in alignment with the position of the opening of the ceiling surface S. The respective cables C hanging down from the opening are inserted through the inside of the ceiling hanger 1, and connected with the interface 705. The details of the route of the cables C inside the ceiling hanger 1 will be further discussed below.

Figure 2A:
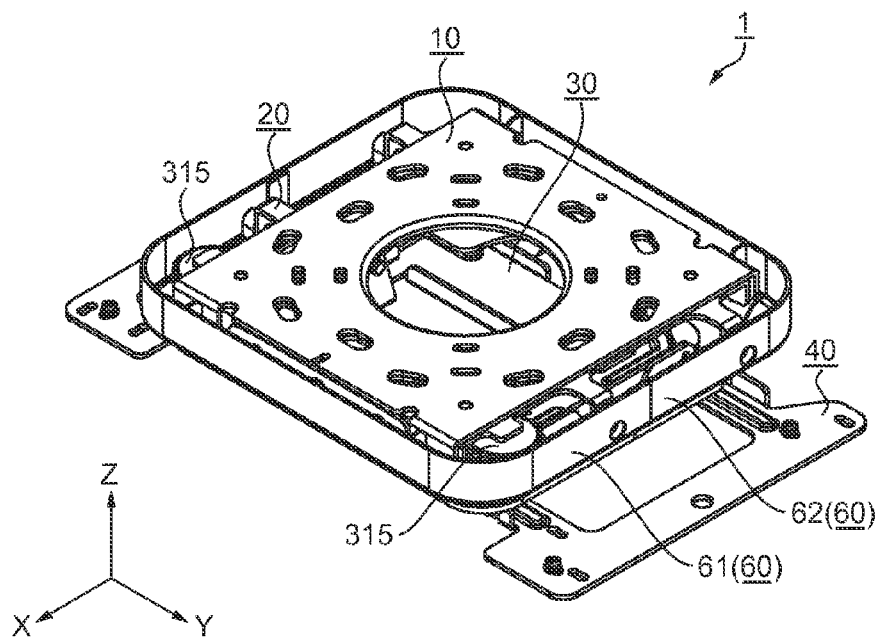
FIGS. 2A through 2C illustrate the ceiling hanger.
Figure 2B:
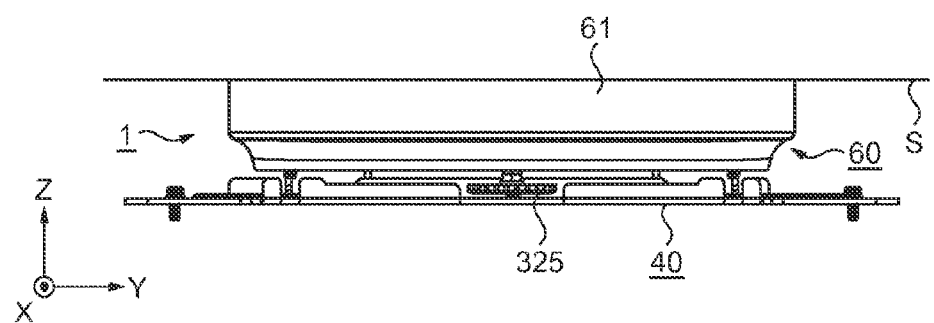
Figure 2C:
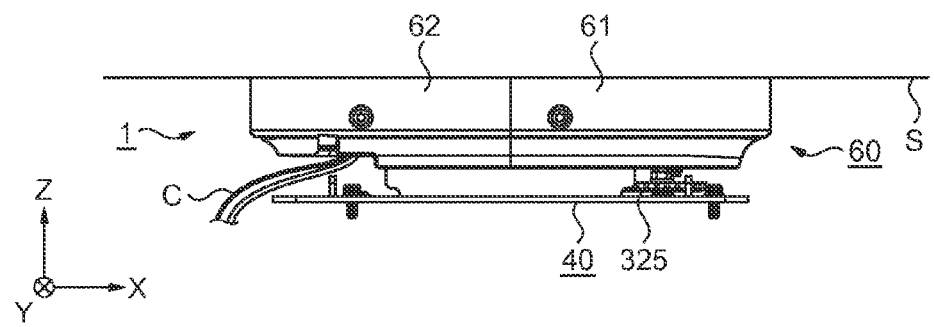
Figure 3A:
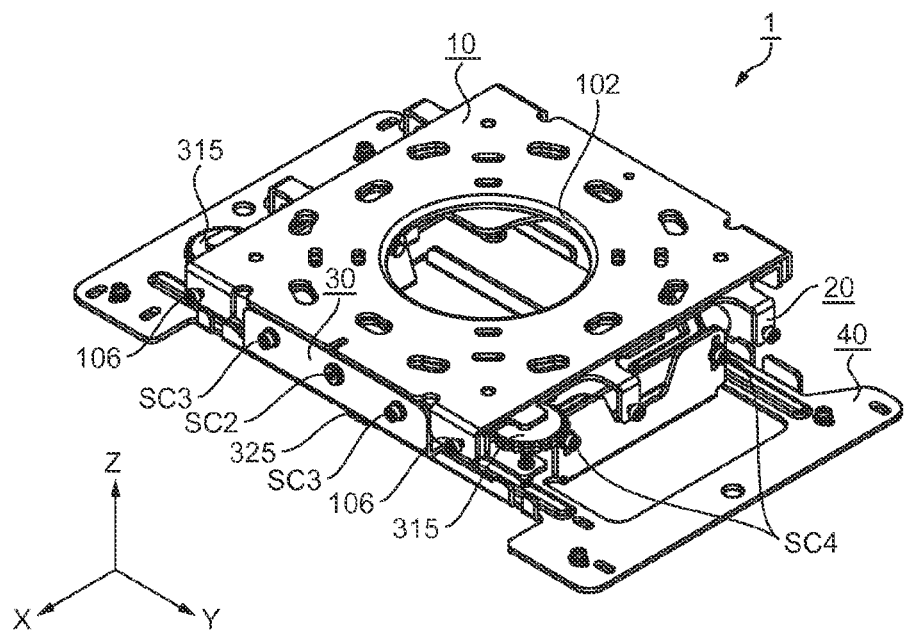
FIGS. 3A through 3C illustrate the ceiling hanger before a cover member is positioned thereon.
Figure 3B:
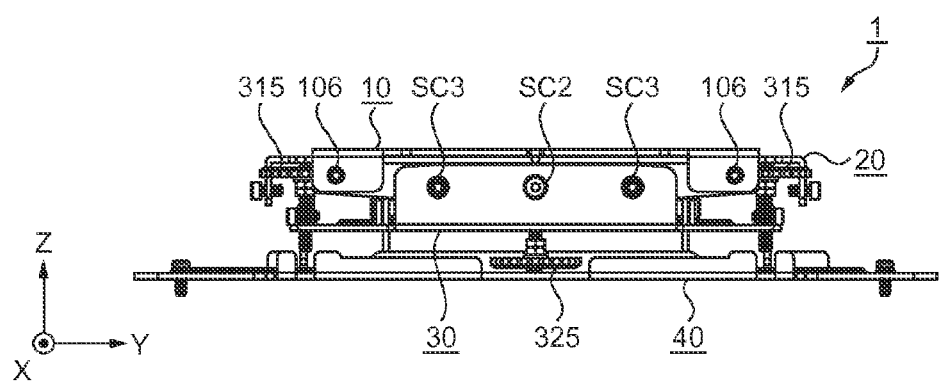
Figure 3C:
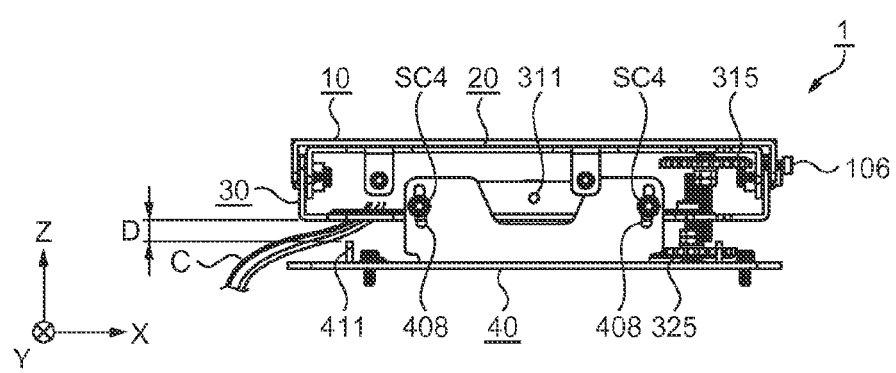

FIGS. 2A through 2C illustrate the ceiling hanger 1. FIG. 2A is a perspective view of the ceiling hanger 1 as viewed from the ceiling surface S side (+Z side). FIG. 2B is a front view of the ceiling hanger 1 as viewed from the front (+X side). FIG. 2C is a side view of the ceiling hanger 1 as viewed from the left (−Y side). FIGS. 3A through 3C illustrate the ceiling hanger 1 before a cover member 60 is positioned. FIG. 3A is a perspective view of the ceiling hanger 1 as viewed from the ceiling surface S side (+Z side). FIG. 3B is a front view of the ceiling hanger 1 as viewed from the front (+X side). FIG. 3C is a side view of the ceiling hanger 1 as viewed from the left (−Y side). The structure of the external appearance of the ceiling hanger 1 is now explained with reference to FIGS. 2A through 3C.

As illustrated in FIGS. 2A through 2C, the ceiling hanger 1 includes four plates of a first plate 10, a second plate 20, a third plate 30, and the fourth plate 40, and further has the cover member 60, and others. Each of the four plates has a substantially rectangular shape, and is formed by sheet metal bending or by other processing.

According to the structure of the ceiling hanger 1, the first plate 10, the second plate 20, and the third plate 30 are disposed on the ceiling surface S side, while the fourth plate 40 to which the projector 7 is fixed is brought to engagement (fitted) with the third plate 30. The first plate 10 and the second plate 20 are positioned on the ceiling surface S (the details of which will be described below). The second plate 20 is fitted to the first plate 10. The third plate 30 is fitted to the second plate 20. The fourth plate 40 is fitted to the third plate 30.

The ceiling hanger 1 performs control in the horizontal direction (X-Y plane direction) by rotating the second plate 20 around a first rotation axis A1 (described below, see FIGS. 4 and 6) with respect to the first plate 10, the details of which will be described below. Moreover, the ceiling hanger 1 performs control in the left-right direction (Y-Z plane direction) by rotating the third plate 30 around a second rotation axis A2 (described below, see FIGS. 4 and 7B) with respect to the second plate 20. Furthermore, the ceiling hanger 1 performs control in the up-down direction (X-Z plane direction) by rotating the fourth plate 40 around a third rotation axis A3 (described below, see FIG. 4) with respect to the third plate 30.

According to the structure of the ceiling hanger 1, assembly of the first plate 10 through the fourth plate 40 to which the projector 7 is fixed is initially completed, and then the position control of the projector 7 is carried out. After completion of the position control, the cover member 60 is positioned on the ceiling hanger 1 in such a manner as to cover the side surfaces of the first plate 10 through the third plate 30 in four directions as illustrated in FIGS. 2A through 2C. The details of the cover member 60 will be described below.

Figure 4:
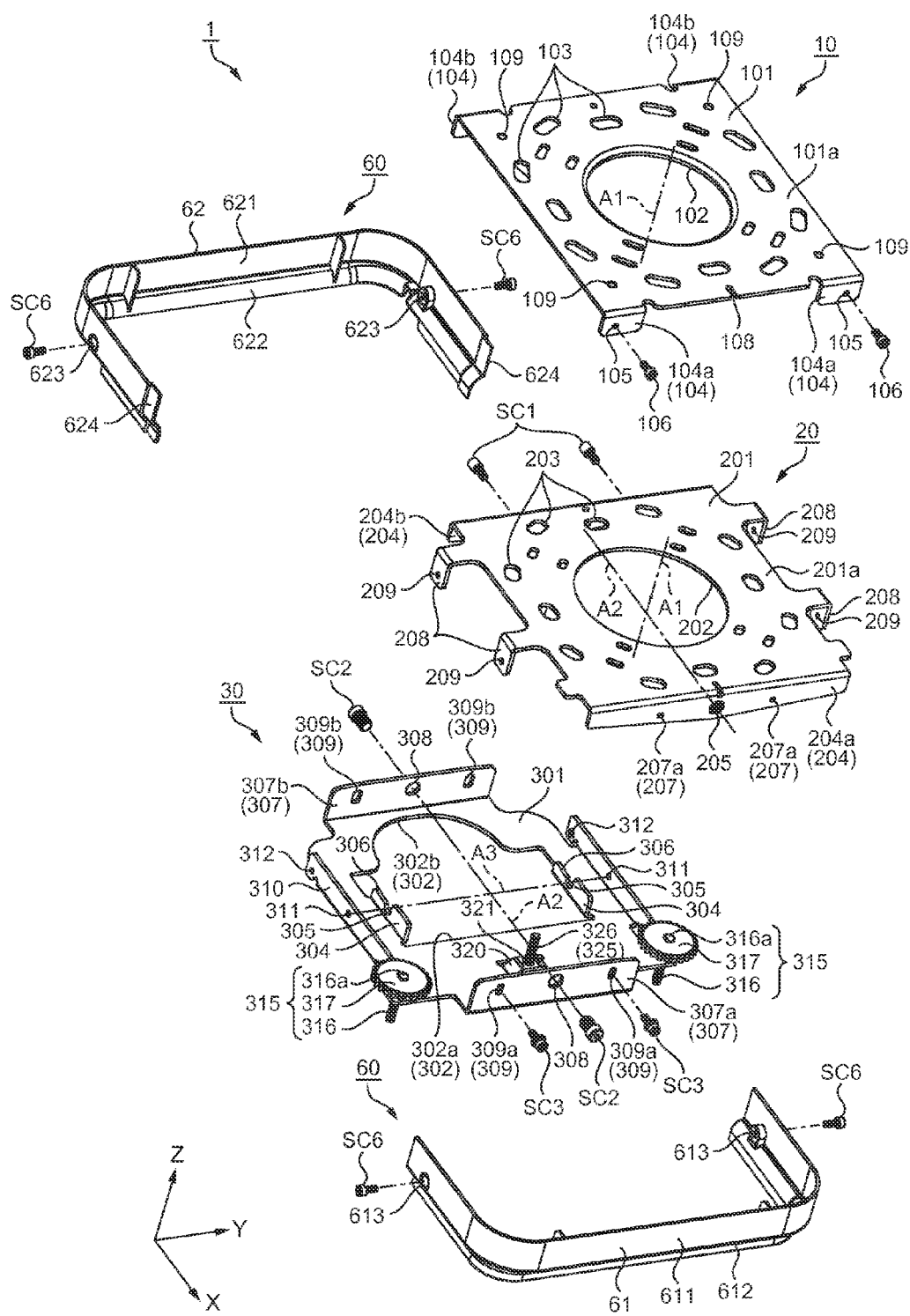
FIG. 4 illustrates the disassembled ceiling hanger.
Figure 5:
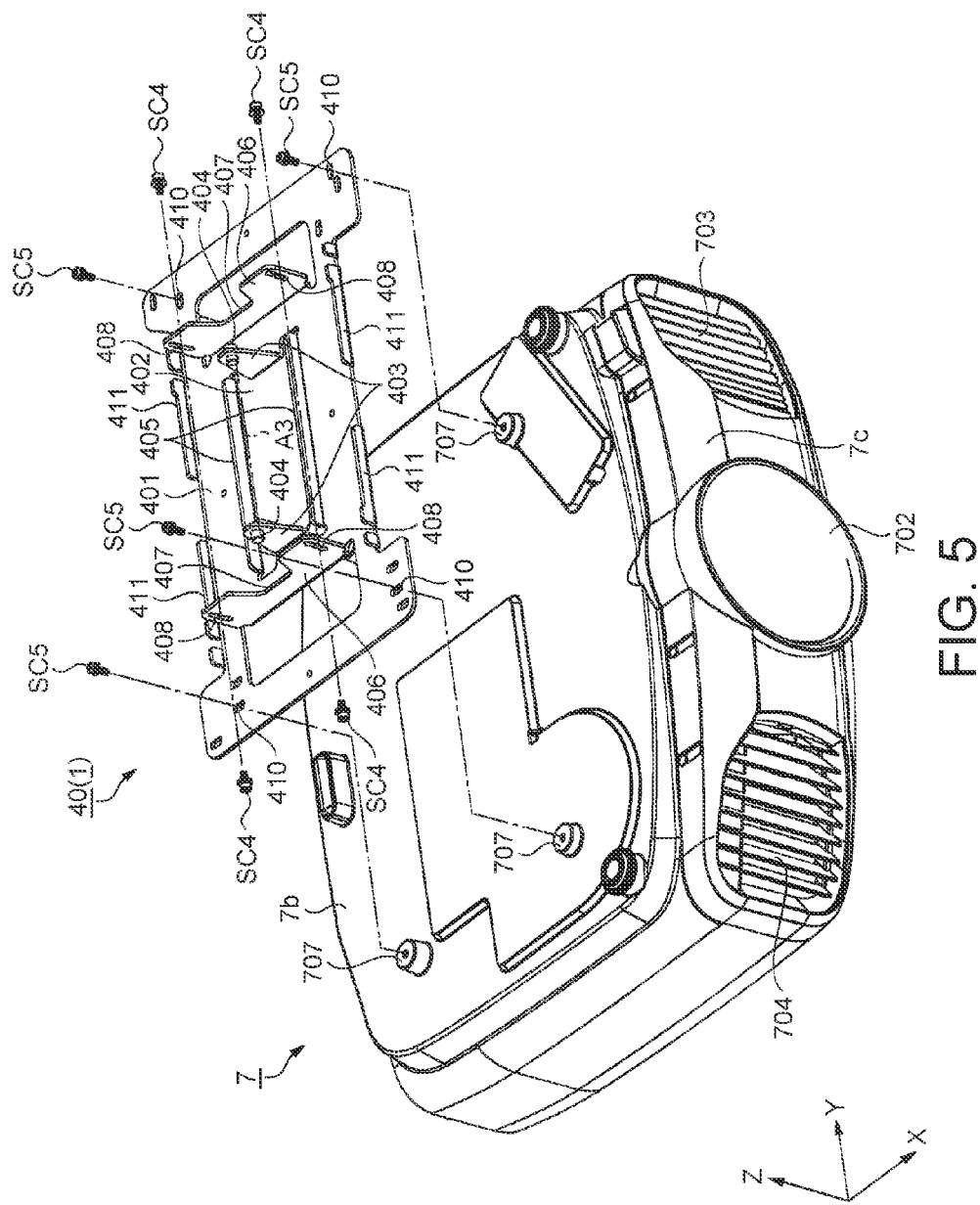
FIG. 5 illustrates the disassembled ceiling hanger.

FIGS. 4 and 5 illustrate the disassembled ceiling hanger 1. More specifically, FIG. 4 shows the first plate 10 through the third plate 30, and the cover member 60 in a disassembled condition. FIG. 5 shows the fourth plate 40 and the projector 7 in a disassembled condition. FIG. 5 contains the projector 7 fixed to the ceiling hanger 1 (fourth plate 40) as well.

Figure 6:
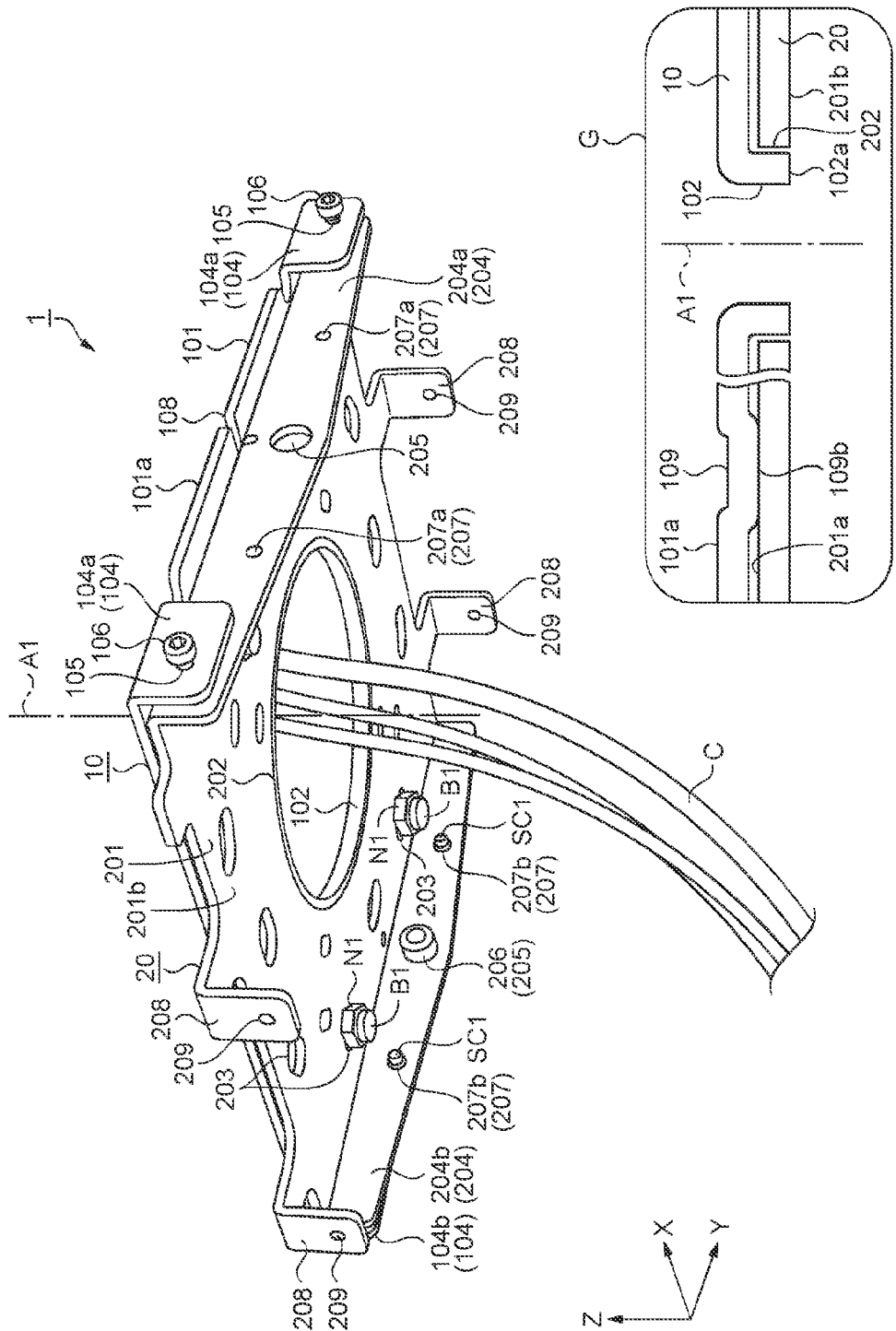
FIG. 6 is a perspective view of a first plate and a second plate positioned on the ceiling surface.
Figure 7A:
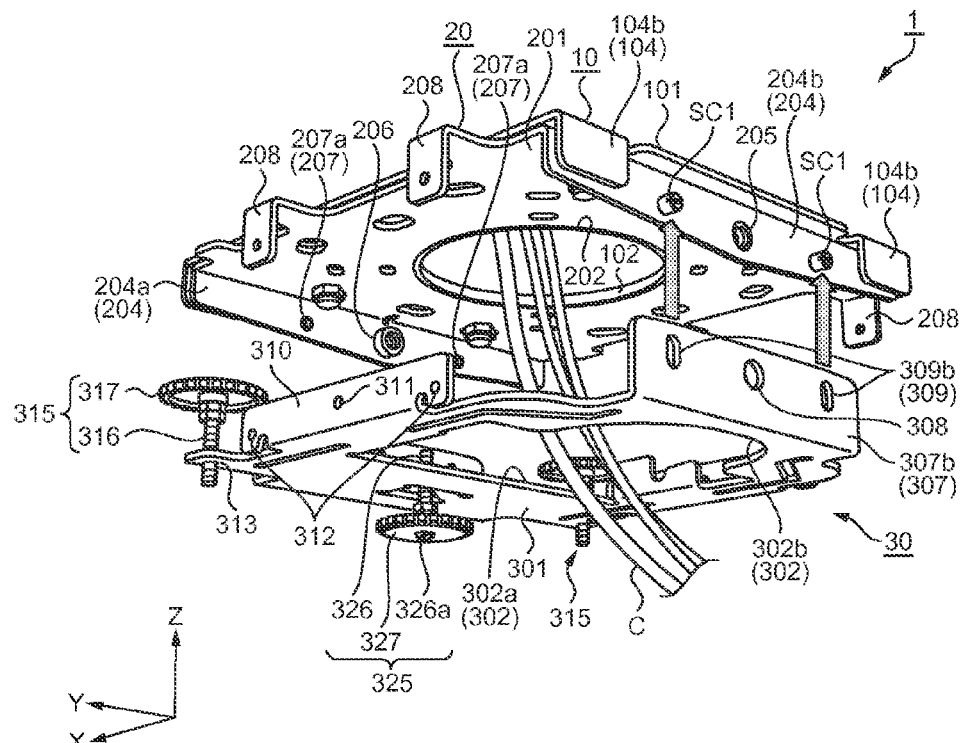
FIGS. 7A and 7B are perspective views of a method for positioning a third plate on the second plate.
Figure 7B:
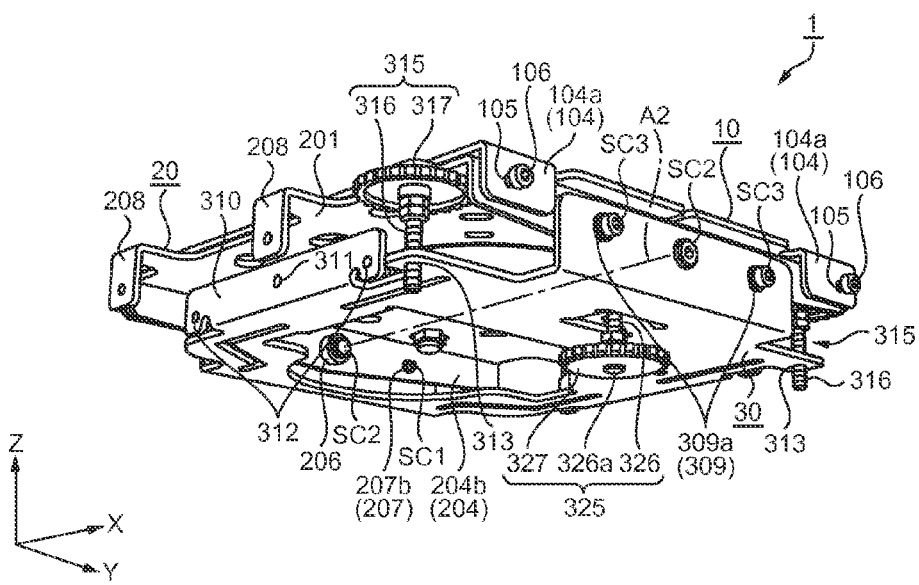

FIG. 6 is a perspective view illustrating the first plate 10 and the second plate 20 positioned on the ceiling surface S. FIG. 6 includes an enlarged view G showing a cross section of engagement (fitting) between a cylindrical portion 102 and a first opening 202, and a cross section of the surroundings of a contact portion 109. FIGS. 7A and 7B are perspective views illustrating a method for positioning (fitting) the third plate 30 on the second plate 20. FIG. 7A is a perspective view showing a midway condition where the third plate 30 is being positioned (fitted) on the second plate 20, while FIG. 7B is a perspective view showing a condition where the third plate 30 has been positioned (fitted) on the second plate 20.

The structure and installation method of the ceiling hanger 1 are now explained with reference to FIGS. 4 through 7B.

As illustrated in FIGS. 4 and 5, the ceiling hanger 1 is constituted by four plates (first plate 10, second plate 20, third plate 30, and fourth plate 40). As noted above, the first plate 10, the second plate 20, and the third plate 30 are provided on the ceiling surface S side, while the fourth plate 40 to which the projector 7 is fixed is brought into engagement (fitted) with the third plate 30.

As illustrated in FIG. 4, the first plate 10 positioned on the ceiling surface S corresponds to a base component for the ceiling hanger 1. The first plate 10 has a substantially rectangular shape formed by sheet metal bending or other processing. The cylindrical portion 102 projecting downward (−Z direction) in a cylindrical shape is provided at the center of a rectangular first plate main body 101. The cylindrical portion 102 in this embodiment is formed by burring. A plurality of types of through holes 103 having a long hole shape are concentrically formed around the cylindrical portion 102 with a predetermined pitch with the center of the concentric circle located at the center of the cylindrical portion 102.

Moreover, as illustrated in FIG. 4, the contact portion 109 recessed downward (−Z direction) by one step and formed by pressing is provided in the vicinity of each of the four corners of the first plate main body 101. Each of the four contact portions 109, more specifically, an end surface 109b (see the enlarged view G in FIG. 6) of the contact portion 109 contacts an upper surface 201a of the second plate 20 at the time of engagement between the first plate 10 and the second plate 20.

As illustrated in FIG. 4, four pieces 104 (pieces 104a on the front side and pieces 104b on the rear side) bended downward (−Z direction) are equipped at the four corners of the first plate main body 101 of the first plate 10 in the front-rear direction (X-axis direction). A screw hole 105 is formed in each of the two pieces 104a of the pieces 104 disposed on the front side (+X side). The screw holes 105 are formed in the direction substantially perpendicular to the first rotation axis A1 (described below, see FIG. 6).

As illustrated in FIG. 4, the second plate 20 is a component overlapped with the first plate 10 and fixed to the ceiling surface S. The second plate 20 makes fine adjustment of the posture of the projector 7 in the horizontal direction in cooperation with the first plate 10.

As illustrated in FIG. 4, the second plate 20 has a substantially rectangular shape formed by sheet metal bending or other processing. The first opening 202 which opens in a circular shape is formed at the center of a rectangular second plate main body 201 of the second plate 20. The first opening 202 is disposed opposed to the cylindrical portion 102 of the first plate 10.

A plurality of types of through holes 203 having a long hole shape are concentrically formed around the first opening 202 with a predetermined pitch with the center of the concentric circle located at the center of the first opening 202. The through holes 203 are disposed in correspondence with the through holes 103 of the first plate 10.

Two pieces 204 bended downward (−Z direction) are provided at the ends of the second plate main body 201 of the second plate 20 in the front-rear direction (X-axis direction). A hole 205 is formed in each of the two pieces 204 (piece 204a on the front side and piece 204b on the rear side) at the center of the piece 204 passing through the center of the first opening 202 and lying substantially on the X-Z plane. As illustrated in FIGS. 6 and 7A, a threaded nut 206 is welded to each of the inner surfaces of the two pieces 204 in correspondence with the hole 205.

Screw holes 207 are formed in each of the two pieces 204 substantially in symmetric positions with respect to the hole 205 in the left-right direction. As illustrated in FIGS. 4 and 6, screw holes 207a are formed in the piece 204a on the front side, while screw holes 207b are formed in the piece 204b on the rear side. As illustrated in FIG. 7A, a screw member SC1 provided with a cylindrical screw head is screwed from the rear side into each of the screw holes 207b of the piece 204b on the rear side.

The screw holes 207a of the piece 204a on the front side constitute screwing portions. A screw member SC3 (described below, see FIG. 7B) used at the time of adjustment in the left-right direction is screwed into each of the screw holes 207a. The screw members SC3 and the screw holes 207a as the screwing portions are disposed substantially in parallel with the second rotation axis A2 (described below, see FIG. 7B).

On the other hand, as illustrated in FIG. 4, two pieces 208 extended from the second plate main body 201 along this plane and bended downward (−Z direction) are provided at each end of the second plate main body 201 in the left-right direction (Y-axis direction) and arranged in the front-rear direction (X-axis direction). A screw hole 209 is formed in each of the pieces 208. The pieces 208 and the screw holes 209 constitute a fixing portion to which the cover member 60 (described below) is fixed.

The method for positioning the first plate 10 and the second plate 20 on the ceiling surface S is now explained with reference to FIG. 6.

FIG. 6 is a perspective view illustrating the ceiling hanger 1 as viewed upward from below, without showing the ceiling surface S. As can be seen from FIG. 6, the first plate 10 is attached with contact between an upper surface 101a of the first plate main body 101 and the ceiling surface S. Before attachment of the first plate 10, an opening (not shown) appears on the ceiling surface S through which the respective cables C having passed through the interior of the ceiling is hanging down.

Initially, for positioning the first plate 10 on the ceiling surface S, the second plate 20 is overlapped with the inside of the first plate 10 as illustrated in FIG. 6. In this step, the first opening 202 of the second plate 20 is allowed to slide on the outer circumference of the cylindrical portion 102 after insertion of the cylindrical portion 102 of the first plate 10 into the first opening 202. The first rotation axis A1 having a rotation axis in the up-down direction (Z-axis direction) is produced by sliding engagement (fitting) between the cylindrical portion 102 and the first opening 202.

Then, the cables C hanging down from the opening are inserted into the cylindrical portion 102 and the first opening 202 as illustrated in FIG. 6. A notch 108 formed at the end of the first plate main body 101 on the front side is directed to the front (+X side). In this condition, the upper surface 101a of the first plate main body 101 is brought into contact with the ceiling surface S with alignment between the cylindrical portion 102 of the first plate 10 and the opening of the ceiling surface S.

According to this embodiment, attachment (fixation) is achieved by using anchor bolts B1 embedded in the ceiling surface S around the opening and extended from the ceiling surface S. More specifically, the anchor bolts B1 are initially inserted into the through holes 103 of the first plate 10 provided in correspondence with the positions of the anchor bolts B1 and the through holes 203 of the second plate 20 provided in correspondence with the through holes 103. Then, nuts N1 are screwed into the anchor bolts B1 from a lower surface 201b side of the second plate main body 201 and fastened, thereby fixing the first plate 10 and the second plate 20 sandwiched between the ceiling surface S and the nuts N1.

After this fixation, first screw members 106 are screwed into the screw holes 105 formed in the two pieces 104a of the first plate 10 to allow abutment between the screw tips of the first screw members 106 and the piece 204a of the second plate 20 on the front side opposed to the screw tips of the first screw members 106. The first screw members 106 are components used at the time of adjustment in the horizontal direction. The first screw members 106 are screwed into the screw holes 105 in directions substantially perpendicular to the first rotation axis A1. According to this embodiment, each of the first screw members 106 is a bolt provided with a hexagonal hole.

When the first plate 10 and the second plate 20 are positioned on the ceiling surface S, the end surfaces 109b of the four contact portions 109 come into contact with the upper surface 201a of the second plate 20 as illustrated in the enlarged view G in FIG. 6. A tip surface 102a of the cylindrical portion 102 has substantially the same height as that of the lower surface 201b of the second plate 20. For adjustment in the horizontal direction, the first opening 202 slides on the outer circumference of the cylindrical portion 102, while the upper surface 201a of the second plate 20 slides on the end surfaces 109b of the contact portions 109. According to this structure, the thickness is reduced to the shortest possible length in the condition of overlap between the first plate 10 and the second plate 20, while allowing engagement and adjustment in the horizontal direction.

The third plate 30 is engaged to the second plate 20, and engages with the fourth plate 40. As illustrated in FIG. 4, the third plate 30 has a substantially rectangular shape formed by sheet metal bending or other processing. An opening 302a opened in a rectangular shape is formed at the center of a rectangular third plate main body 301 in the area opposed to the first opening 202 of the second plate 20. The third plate main body 301 has a semicircular-shaped opening 302b disposed on the rear side of the opening 302a and connected therewith.

The opening 302a and the opening 302b constitute a second opening 302. Thus, the second opening 302 has the opening 302a in the area opposed to the first opening 202, and the opening 302b offset toward the rear. The rear region of the second opening 302 offset in the rear direction corresponds to the side through which the cables C are extended.

Pieces 304 bended upward (+Z direction) are provided at the ends of the opening 302a of the third plate 30 in the left-right direction (Y-axis direction). A holding portion 305 having a circular-arc-shaped notch for holding a support shaft 404 (described below) of the fourth plate 40, and a guide 306 guiding the support shaft 404 toward the holding portion 305 are provided at each upper end of the two pieces 304. The guide 306 is extended from the rear side of the holding portion 305 to connect with the holding portion 305. The guide 306 is inclined downward toward the holding portion 305.

Two pieces 307 bended upward (+Z direction) are provided at the ends of the third plate main body 301 of the third plate 30 in the front-rear direction (X-axis direction). A hole 308 is formed in each of the two pieces 307 (piece 307a on the front side and piece 307b on the rear side) at the position opposed to the hole 205 of the second plate 20.

Long holes 309 having an elongated hole shape are concentrically formed in each of the two pieces 307 in such positions as to be substantially symmetric with respect to the hole 308 in the left-right direction with the center of the concentric circle located at the center of the hole 308. More specifically, as illustrated in FIGS. 4 and 6, long holes 309a are formed in the piece 307a on the front side, while long holes 309b are formed in the piece 307b on the rear side.

The long holes 309 are concentrically disposed around the second rotation axis A2 (described below). The holes 308 and the long holes 309 are formed in correspondence with the holes 205 and the screw holes 207 of the second plate 20. The long holes 309a formed in the piece 307a on the front side are components used at the time of adjustment in the left-right direction, and guide the screw members SC3 (described below).

Two pieces 310 bended upward (+Z direction) are provided at the ends of the third plate main body 301 of the third plate 30 in the left-right direction (Y-axis direction). A round hole 311 is formed in each of the two pieces 310 at the position in which the center axis of the holding portion 305 formed in the piece 304 and having a circular-arc shape crosses the piece 310. The holes 311 are openings through which the positions of the support shafts 404 (described below) held by the holding portions 305 are checked. Screw holes 312 are formed in each of the two pieces 310 in such positions as to be symmetric in the front-rear direction with respect to the hole 311 (the point in which the center axis of the holding portion 305 crosses the piece 310).

The screw holes 312 of the piece 310 constitute screwing portions. Screw members SC4 (described below) used at the time of adjustment in the up-down direction are screwed into the screw holes 312. The screw members SC4 and the screw holes 312 as the screwing portions are disposed substantially in parallel with the third rotation axis A3 (described below).

A screw hole 313 (see FIG. 7B) is formed at each corner of the third plate main body 301 of the third plate 30 on the front side (+X side) in the left-right direction (Y-axis direction). A second screw member 315 is screwed into each of the screw holes 313.

The second screw members 315 are components used at the time of adjustment in the left-right direction. According to this embodiment, each of the second screw members 315 is constituted by a threaded screw portion 316, and a dial 317 disposed near one end 316a of the screw portion 316 to rotate the screw portion 316. The one end 316a of the screw portion 316 has a curved end surface. Describing in more detail, the dial 317 has a disk shape having a larger diameter than that of the screw portion 316, and has an outer circumferential surface provided with projections and recesses.

Each of the second screw members 315 brings the screw portion 316 into engagement with the screw hole 313 from the upper side of the third plate main body 301 (+Z side). In this condition, the dial 317 is located above the third plate main body 301 (+Z side). For adjustment in the left-right direction, the dial 317 is rotated by fingers. The second screw members 315 are arranged in the left-right direction with the center therebetween located on the second rotation axis A2 (described below), and positioned substantially perpendicular to the second rotation axis A2.

The third plate 30 has a raised portion 320 raised upward (+Z side) by pressing a part of the front (+X side) region of the third plate main body 301 inside of the piece 307a. A screw hole 321 is formed in the upper part of the raised portion 320. A third screw member 325 is screwed into the screw hole 321.

The third screw member 325 is a component used at the time of adjustment in the up-down direction. The third screw member 325 has a structure substantially similar to the second screw member 315. More specifically, the third screw member 325 has a threaded screw portion 326, and a dial 327 provided near one end 326a of the screw portion 326 to rotate the screw portion 326. The one end 326a of the screw portion 326 has a curved end surface.

The third screw member 325 brings the screw portion 326 into engagement with the screw hole 321 from the lower side (−Z side) of the third plate main body 301. In this condition, the dial 327 is located below (−Z side) the third plate main body 301. For adjustment in the up-down direction, the dial 327 is rotated by fingers. The third screw member 325 is positioned substantially perpendicular to the third rotation axis A3.

The method for positioning the third plate 30 on the second plate 20 is now explained with reference to FIGS. 7A and 7B.

Initially, for positioning the third plate 30 on the second plate 20, the cables C inserted through the cylindrical portion 102 and the first opening 202 of the first plate 10 and the second plate 20 are inserted into the second opening 302 of the third plate 30 as illustrated in FIG. 7A. Then, the area of the third plate 30 where the second screw members 315 are disposed are directed on the front side (+X side). In this condition, the two long holes 309b formed in the piece 307b of the third plate 30 on the rear side are fitted to the screw heads of the two screw members SC1 engaging with the screw holes 207b of the pieces 204b of the second plate 20 on the rear side as indicated by arrows in FIG. 7A.

Then, the holes 308 of the third plate 30 are aligned with the holes 205 of the second plate 20, and screw members SC2 are inserted into the holes 308 and the holes 205, whereupon the screw members SC2 are screwed into the nuts 206 provided inside the holes 205 and fixed thereto. The holes 308 and the holes 205 are through holes. The third plate 30 fitted to the second plate 20 by the screws is fixed thereto in such a manner as to be rotatable around the screw members SC2. By this arrangement, the third plate 30 produces the second rotation axis A2 having a rotation axis in the front-rear direction (X direction) by engagement (fitting) with the second plate 20 via the screw members SC2.

Subsequently, the screw members SC3 are inserted into the long holes 309a of the third plate 30, and screwed into the screw holes 207a (see FIG. 6) of the second plate 20 as illustrated in FIG. 7B. By these steps, positioning of the third plate 30 on the second plate 20 is completed as illustrated in FIG. 7B.

The fourth plate 40 is a component which fixes the projector 7 and is fitted to the third plate 30. As illustrated in FIG. 5, the fourth plate 40 has a substantially rectangular shape formed by sheet metal bending or other processing. An opening 402 which opens in a rectangular shape is formed at the center of a rectangular fourth plate main body 401.

A piece 403 bended upward (+Z side) is provided at each end of the opening 402 of the fourth plate 40 in the left-right direction (Y-axis direction). The support shaft 404 which has an axis in the left-right direction (Y-axis direction), has a cylindrical shape, and projects to the outside of the piece 403 is fixed to each tip of the pieces 403. The support shafts 404 are rotatably held by the holding portions 305 of the third plate 30 shown in FIG. 4.

A piece 405 bended upward (+Z side) is provided at each end of the opening 402 in the front-rear direction (X-axis direction). Each of the pieces 405 provided for increasing the rigidity of the fourth plate 40 protrudes from the fourth plate main body 401 by only a small length.

Pieces 406 bended upward (+Z side) are formed by cutting and raising a part of the fourth plate main body 401 on the left and right sides of the opening 402 (Y-axis direction). A notch 407 is formed at the center of each of the pieces 406 to cut the piece 406 downward from the upper end thereof. Each of the notches 407 is so sized that the support shaft 404 disposed inside the notch 407 in the left-right direction can be visually recognized as viewed in the left-right direction.

A pair of long holes 408 are provided on each of the pieces 406 in positions substantially symmetric in the front-rear direction with respect to the support shaft 404 and concentrically with the center of the concentric circle located on the support shaft 404. The long holes 408 are positioned concentrically around the third rotation axis A3. The long holes 408 of the fourth plate 40 are formed in correspondence with the screw holes 312 of the third plate 30. The long holes 408 are components used at the time of adjustment in the up-down direction, and guide the screw members SC4 (described below).

A plurality of holes 410 are formed in each of the four corners of the fourth plate main body 401. As illustrated in FIG. 5, the projector 7 is fixed to the fourth plate 40 by inserting screw members SC5 from above (+Z side) into the holes 410 corresponding to the four hanging legs 707 provided on the lower surface 7b of the projector 7, and fastening the screw members SC5 in engagement with the legs 707.

Two pieces 411 bended upward (+Z side) are provided on the recessed area of the fourth plate main body 401 toward the inside on each side in the front-rear direction (X-axis direction). Each of the pieces 411 is provided for increasing the rigidity of the fourth plate 40 similarly to the pieces 405, and protrudes from the fourth plate main body 401 by only a small length. The pieces 411 constitute clearance securing portions (described below).

Figure 8A:
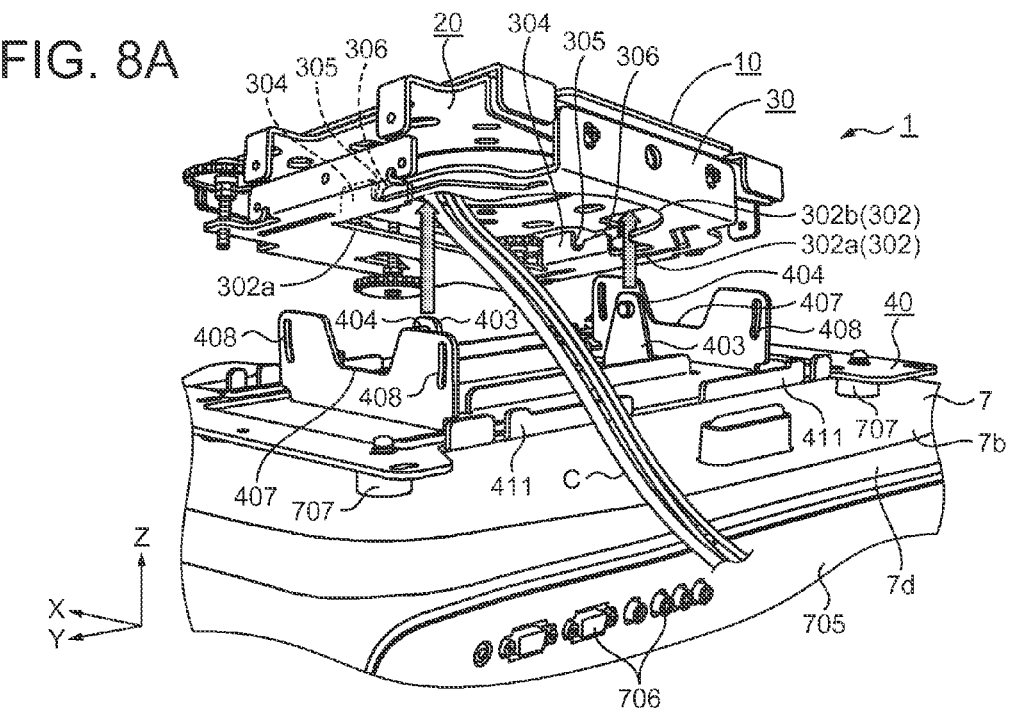
FIGS. 8A through 8C are perspective views of a method for positioning a fourth plate on the third plate with a projector fixed to the fourth plate.
Figure 8B:
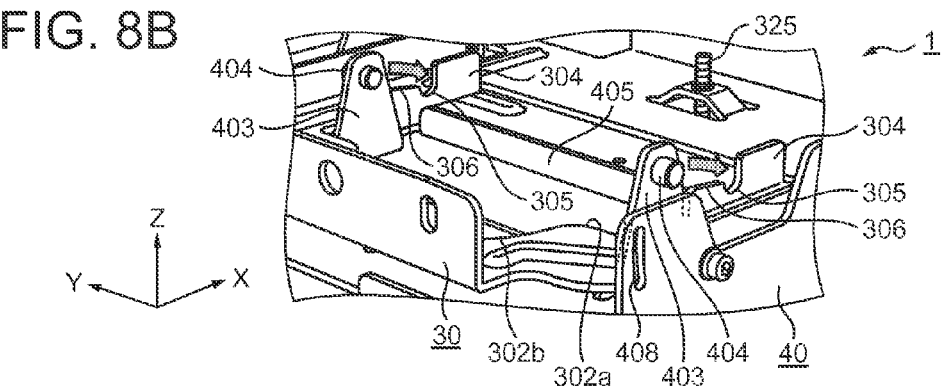
Figure 8C:
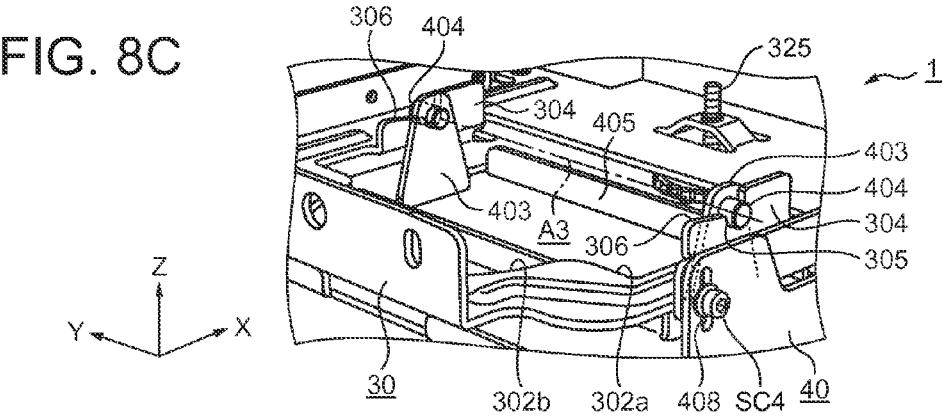

FIGS. 8A through 8C are perspective views showing the method for positioning (fitting) the fourth plate 40 on the third plate 30 with the projector 7 fixed to the fourth plate 40. FIG. 8A is a perspective view during insertion of the fourth plate 40 into the openings 302a of the third plate 30. FIG. 8B is a perspective view showing the support shafts 404 guided along the guides 306. FIG. 8C is a perspective view showing the support shafts 404 held by the holding portions 305. The method for positioning the fourth plate 40 on the third plate 30 is now explained with reference to FIGS. 8A through 8C.

Positioning of the fourth plate 40 on the third plate 30 is achieved by raising and shifting the projector 7 fixed to the fourth plate 40. Initially, as illustrated in FIG. 8A, the projector 7 fixed to the fourth plate 40 is gradually raised while the cables C extended through the second opening 302 of the third plate 30 are lying on the rear side (−X side) of the fourth plate 40. By this step, the cables C are extended through the clearance between the opening 302b positioned in the rear area of the second opening 302 and the rear side pieces 411 of the fourth plate 40 toward the rear side (rear surface 7d side of the projector 7).

By the raise of the projector 7, the two pieces 403 of the fourth plate 40 are inserted into the area of the opening 302b positioned on the rear side of the pieces 304 of the third plate 30 in the direction indicated by arrows in FIG. 8A. Then, as illustrated in FIG. 8B, the support shafts 404 provided on the pieces 403 and inserted from below are shifted in the front direction (+X direction) into the openings 302a of the third plate 30 to be carried on the guides 306 of the third plate 30 (pieces 304). In this condition, the support shafts 404 are slid along the guides 306 toward the front as indicated by arrows in FIG. 8B.

After slid along the guides 306 toward the front, the support shafts 404 come to positions to be held by the holding portions 305 as illustrated in FIG. 8C. In the condition in which the support shafts 404 are held by (fitted to) the holding portions 305, the third rotation axis A3 having a rotation axis in the left-right direction (in parallel with the Y axis) is produced.

Then, the screw members SC4 are inserted into the long holes 408 of the fourth plate 40 with alignment between the long holes 408 and the corresponding screw holes 312 (see FIGS. 7A and 7B) of the third plate 30, and fixed to the screw holes 312 with engagement therebetween as illustrated in FIG. 8C and FIG. 3C. By this step, the fourth plate 40 to which the projector 7 is fixed can be positioned on the third plate 30 as illustrated in FIG. 8C and FIG. 3C.

As a consequence, the projector 7 can be fixed to the ceiling surface S via the ceiling hanger 1 by carrying out the methods for positioning the first plate 10 through the fourth plate 40 discussed above.

The operations until the support shafts 404 is allowed to be held on the holding portions 305 are performed in a blind manner. Thus, the structure in this embodiment is so designed as to allow visual check of whether the support shafts 404 are held on appropriate positions of the holding portions 305 (substantially at the positions where the center axes of the support shafts 404 agree with the center axes of the holding portions 305).

More specifically, the four plates constituting the ceiling hanger 1 are made of metal which has the external surface colored in black. A white member (not shown) having a circular shape concentric with the center axis of the support shaft 404 is affixed (or applied) to the outer end surface of each of the two support shafts 404. It is checked whether the white member can be identified through the hole 311 (FIGS. 4 and 3C) as an opening formed on the center axis of the holding portion 305 in the left-right direction. When the white member is identified through the hole 311, it is determined that the support shaft 404 is held at the proper position of the holding portion 305. The diameter of the hole 311 is made smaller than the diameter of the white member.

In this condition, the cables C are extended through a clearance between the third plate 30 and the fourth plate 40 produced in the up-down direction (Z direction) and located on the rear side (−X side). More specifically, as illustrated in FIGS. 8A and 3C, the cables C are extended toward the rear (−X direction) through a clearance D (see FIG. 3C) formed between the third plate main body 301 around the second opening 302 of the third plate 30 and the piece 411 of the fourth plate 40. The portion of the clearance D corresponds to a clearance securing portion.

As illustrated in FIG. 1B, the cables C in this condition are connected with a connect unit 706 (see FIG. 8A) included in the interface 705 on the rear surface 7d of the projector 7 on the rear side (−X side). The cables C are constituted by various types of cables such as power source cables, analog RGB cables, video cables, DVI cables, HDMI cables, and network cables, and connected with image apparatuses, personal computers, networks, and others.

The method for controlling the position (posture) of the projector 7 positioned on the ceiling hanger 1 is now explained.

The ceiling hanger 1 in this embodiment controls the position in the horizontal direction (X-Y plane direction), left-right direction (Y-Z plane direction), and up-down direction (X-Z plane direction). During the control, an image is projected from the projector 7. The control is performed by shifting the position (posture) of the projector 7 such that the position of the image projected from the projector 7 agrees with the projection position determined on the screen.

Figure 9A:
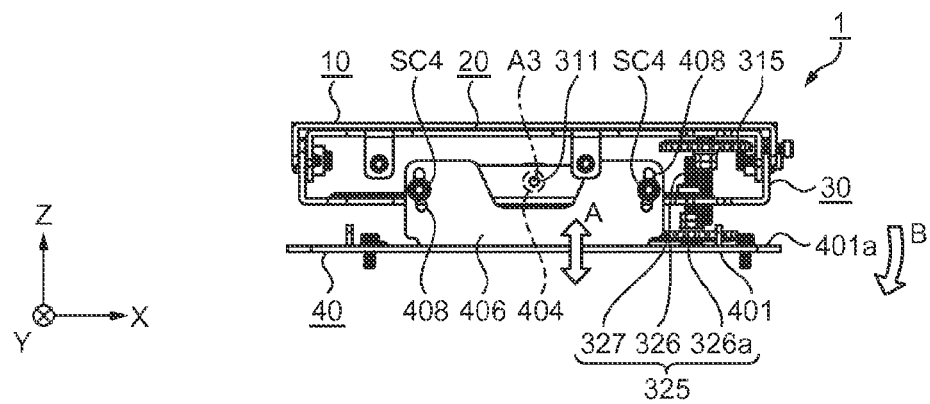
FIGS. 9A through 9C illustrate a method for controlling the installation position of the projector in the up-down direction.
Figure 9B:
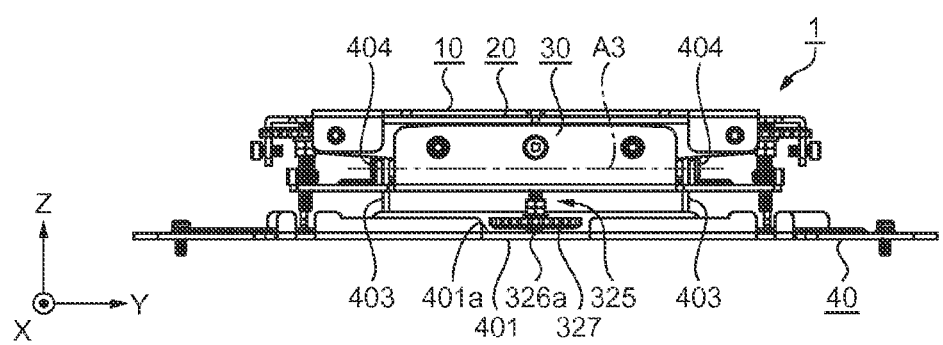
Figure 9C:
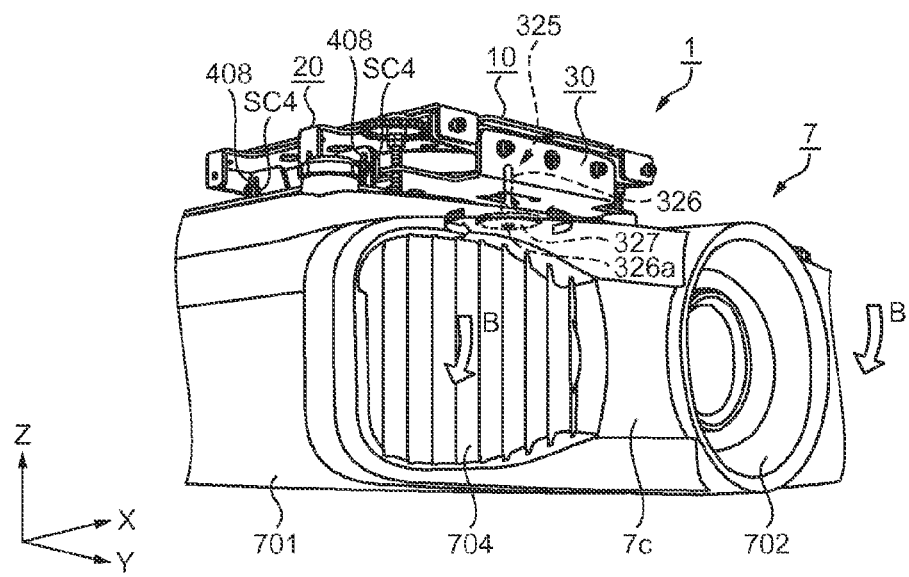

FIGS. 9A through 9C illustrate the method of adjustment for the installation position (posture) of the projector 7 in the up-down direction. FIG. 9A is a side view of the ceiling hanger 1 as viewed from the left (−Y side). FIG. 9B is a front view of the ceiling hanger 1 as viewed from the front side (+X side). FIG. 9C is a perspective view of the ceiling hanger 1 as obliquely viewed from the front (+X side). The method for the control in the up-down direction is now explained with reference to FIGS. 9A through 9C.

Initially, as illustrated in FIG. 9A, the two screw members SC4 on the left side surface of the fourth plate 40 are rotated to be loosened. Simultaneously, the two screw members SC4 on the opposite side (right side surface) are loosened. Then, the projector 7 is held and shifted in the up-down direction (indicated by an arrow A) to position the projector 7 at an approximate position. In this step, the projector 7 is disposed at a slightly upper position so that downward fine adjustment can be made by using the third screw member 325 (described below). After alignment with the approximate position, the four screw members SC4 are fastened for temporary fixation.

Then, as illustrated in FIG. 9C, the dial 327 of the third screw member 325 is rotated in the direction indicated by arrows in FIG. 9C to allow abutment between the end surface of the one end 326a of the screw portion 326 and an upper surface 401a of the fourth plate main body 401. After the abutment, the dial 327 is further rotated in the same direction to shift the projector 7 downward (−Z direction).

More specifically, the third screw member 325 is rotated to abut the upper surface 401a of the fourth plate main body 401, and further rotated in the same direction to rotate the fourth plate 40 (projector 7) downward (−Z direction) around the third rotation axis A3 (shown in FIG. 9B) as indicated by an arrow B in FIGS. 9A and 9C for execution of the control. Accordingly, the control in the up-down direction, which is achieved by the volume of rotation of the third screw member 325, can make fine adjustment. According to this embodiment, the adjustment of the third screw member 325 in the up-down direction ranges approximately from 0° to −8°.

After the downward fine adjustment by rotation of the third screw member 325 for position alignment in the up-down direction, the four screw members SC4 are fastened for permanent fixation. The abutment between the third screw member 325 and the fourth plate 40 prevents positional shift after the adjustment and allows easy tightening of the screw members SC4 without the necessity of caution for preventing positional shift. The control in the up-down direction can be completed by these steps.

Figure 10A:
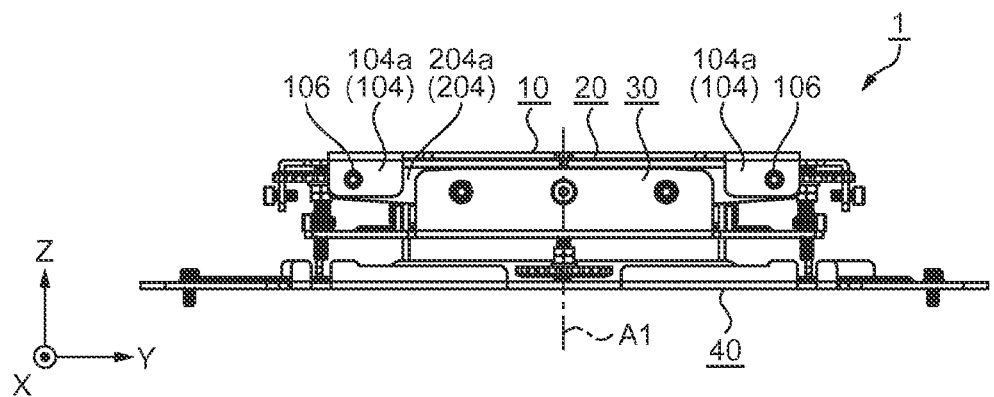
FIGS. 10A and 10B illustrate a method for controlling the installation position of the projector in the horizontal direction.
Figure 10B:
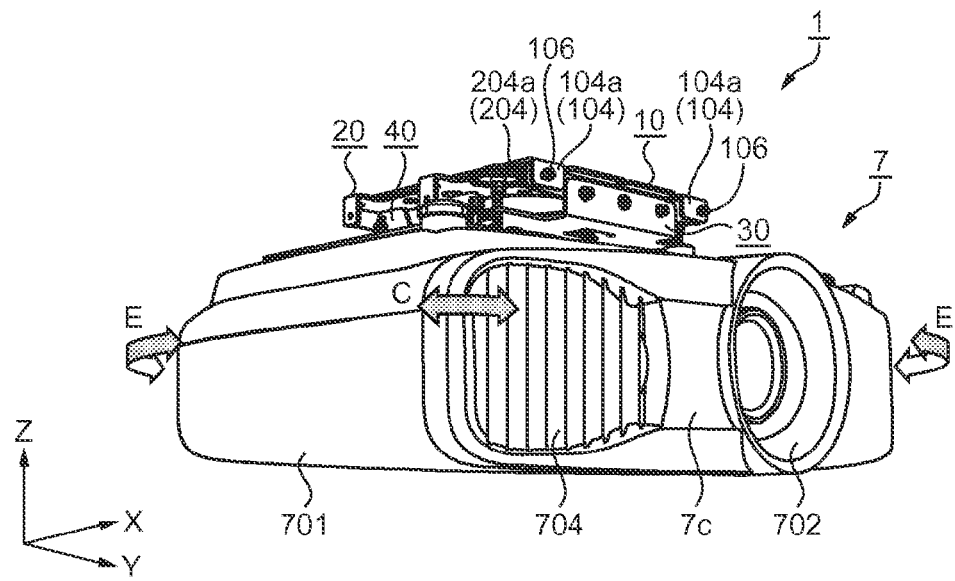

FIGS. 10A and 10B illustrate the method for the control of the installation position (posture) of the projector 7 in the horizontal direction. FIG. 10A is a front view of the ceiling hanger 1 as viewed from the front (+X side), while FIG. 10B is a perspective view of the ceiling hanger 1 as obliquely viewed from the front (+X side). The method for the control in the horizontal direction is now explained with reference to FIGS. 10A and 10B.

Initially, as illustrated in FIGS. 10A and 10B, the first screw members 106 engaging with the two pieces 104a (screw holes 105) of the first plate 10 on the front side are rotated to be loosened. Then, the projector 7 is held and rotated in the horizontal direction (indicated by an arrow E in FIG. 10B) to be positioned at an approximate position. This rotation is a rotation in the horizontal direction around the first rotation axis A1.

After alignment with the approximate position, the two first screw members 106 are fastened to allow abutment of the screw tips of the first screw members 106 with the opposed pieces 204a of the second plate 20 on the front side. Then, the first screw members 106 are further rotated in the same direction to rotate the second plate 20 (and the projector 7 as well) in the horizontal direction (indicated by an arrow C in FIG. 10B) around the first rotation axis A1 for execution of the control. Accordingly, the control in the horizontal direction, which is achieved by the volume of rotation of the first screw members 106, can make fine adjustment.

According to the ceiling hanger 1 in this embodiment, the projector 7 is horizontally rotated to the left by rotating (fastening) the first screw member 106 on the left side, while is horizontally rotated to the right by rotating (fastening) the first screw member 106 on the right side. The horizontal control by the first screw members 106 in this embodiment ranges approximately from −3° to +3°.

After completion of the adjustment, the abutment between the first screw members 106 and the second plate 20 can achieve fixation while preventing positional shift after the adjustment. The control in the horizontal direction can be completed by these steps.

Figure 11A:
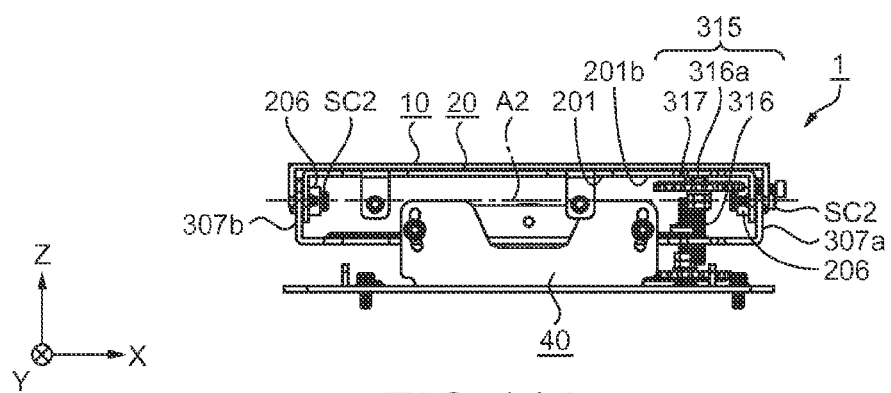
FIGS. 11A through 11C illustrate a method for controlling the installation position of the projector in the left-right direction.
Figure 11B:
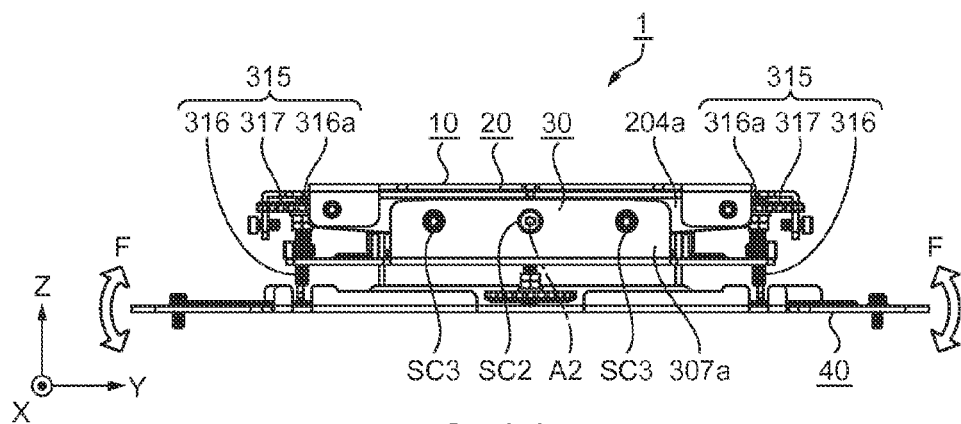
Figure 11C:
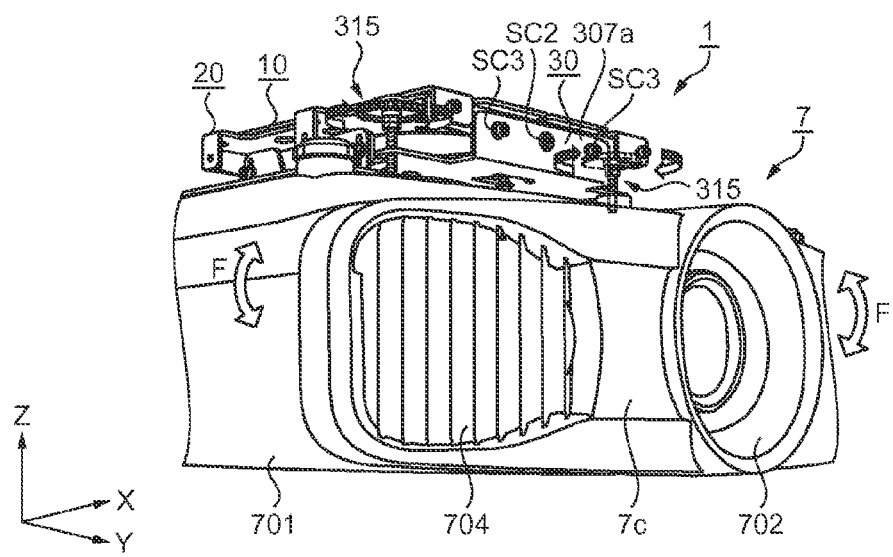

FIGS. 11A through 11C illustrate the method for the control of the installation position (posture) of the projector 7 in the left-right direction. FIG. 11A is a side view of the ceiling hanger 1 as viewed from the left (−Y side). FIG. 11B is a front view of the ceiling hanger 1 as viewed from the front (+X side). FIG. 11C is a perspective view of the ceiling hanger 1 as obliquely viewed from the front (+X side). The method for the inclination control in the left-right direction is now explained with reference to FIGS. 11A through 11C.

Initially, as illustrated in FIG. 11B, the two screw members SC3 of the pieces 307a of the third plate 30 on the front side are rotated to be loosened. Then, as illustrated in FIG. 11A, the dial 317 of the second screw member 315 is rotated in the manner indicated by arrows in FIG. 11C to allow abutment between the end surface of the one end 316a of the screw portion 316 and the lower surface 201b of the second plate main body 201. The dial 317 is further rotated in the same direction to rotate the third plate 30 (and the projector 7 as well) in the left-right direction (indicated by arrows F in FIGS. 11B and 11C) around the second rotation axis A2 (see FIG. 11A) for execution of the control. Accordingly, the inclination control in the left-right direction, which is achieved by the volume of rotation of the second screw member 315, can make fine adjustment.

According to the ceiling hanger 1 in this embodiment, the projector 7 is rotated in the direction opposite to the clockwise direction by rotating (fastening) the second screw member 315 on the left side as the projector 7 is viewed from the front (+X side), and is rotated clockwise by rotating (fastening) the second screw member 315 on the right side.

The inclination control by the second screw members 315 in the left-right direction in this embodiment ranges approximately from −2.5° to +2.5°.

After alignment of the position in the left-right direction by fine adjustment of the inclination in the left-right direction by rotation of the second screw members 315, the two screw members SC3 are fastened and fixed. The abutment between the second screw members 315 and the second plate 20 prevents positional shift after completion of the adjustment and allows easy fastening of the screw members SC3 without the necessity of caution for preventing positional shift. The inclination control in the left-right direction is completed by these steps.

Figure 12A:
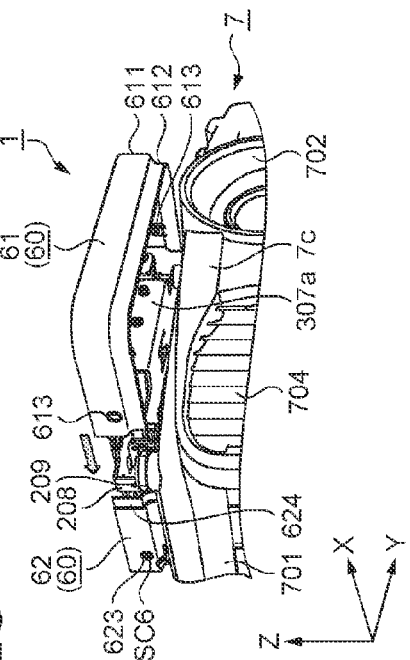
FIGS. 12A through 12D are perspective views showing a method for positioning a cover member on the second plate.
Figure 12C:
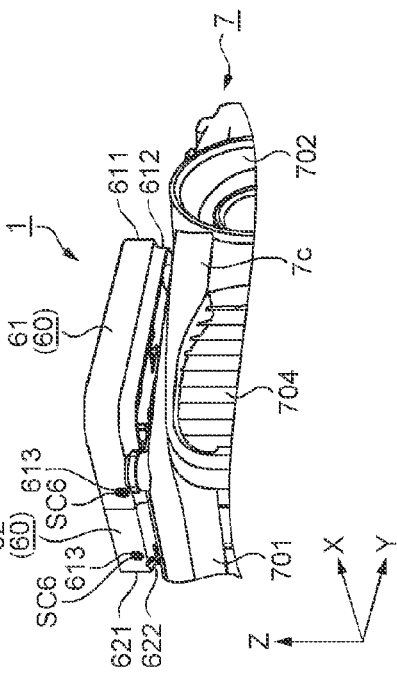
Figure 12B:
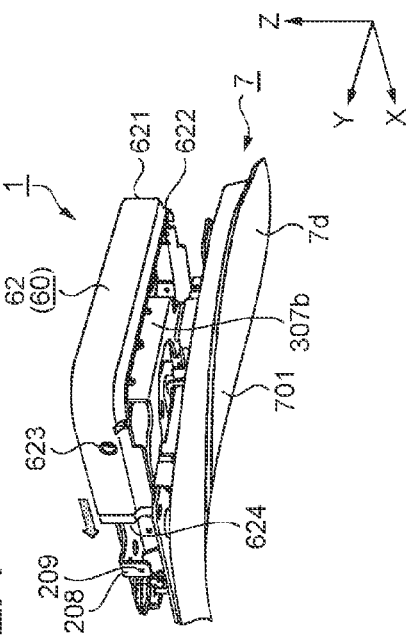
Figure 12D:
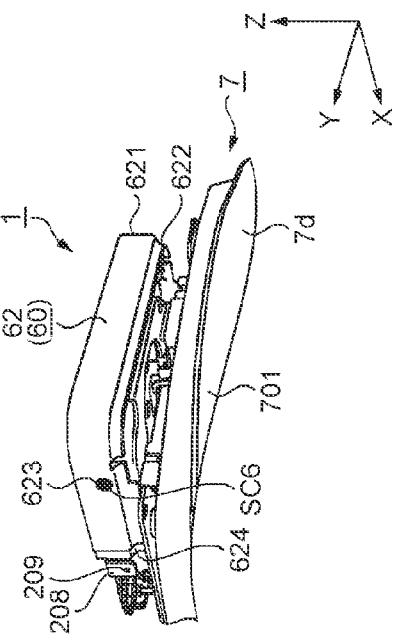

FIGS. 12A through 12D are perspective views illustrating the method for positioning the cover member 60 on the second plate 20. More specifically, FIG. 12A is a perspective view showing a midway condition in which a second cover 62 is being attached to the second plate 20. FIG. 12B is a perspective view showing a condition in which the second cover 62 has been attached to the second plate 20. FIG. 12C is a perspective view showing a midway condition in which a first cover 61 is being attached to the second plate 20. FIG. 12D is a perspective view showing a condition in which the first cover 61 has been attached to the second plate 20. The structure of the cover member 60, and the method for positioning the cover member 60 on the ceiling hanger 1 are now explained with reference to FIGS. 1A through 4 and FIGS. 12A through 12D.

The cover member 60 is a component provided to decorate and protect the structure of the first plate 10 through the fourth plate 40. The cover member 60 is attached after the first plate 10 through the fourth plate 40 to which the projector 7 is attached are all positioned on the ceiling surface S, and after completion of fine adjustment of the installation position of the projector 7. According to this embodiment, the cover member 60 covers the side surfaces of the outer peripheries of the first plate 10 through the third plate 30 in the range from the ceiling surface S to the projector 7.

As illustrated in FIGS. 1A through 2C, the cover member 60 is so sized as to avoid the movable range of the ceiling hanger 1 for the adjustment of the first plate 10 through the fourth plate 40. Also, the cover member 60 is so sized as to cover the components operated at the time of adjustment of the ceiling hanger 1. The components operated at the time of adjustment in this context include the first screw members 106 for control in the horizontal direction, the second screw members 315 and the screw members SC3 for inclination control in the left-right direction, and the third screw member 325 and the screw members SC4 for control in the up-down direction as illustrated in FIGS. 4 and 5.

As illustrated in FIG. 4, the cover member 60 in this embodiment is constituted by the first cover 61 covering the side surface on the front side and the side surface in the left-right direction approximately on the front half of the ceiling hanger 1 (first plate 10 through third plate 30), and the second cover 62 covering the side surface on the rear side and the side surface in the left-right direction approximately on the rear half. According to this embodiment, the first cover 61 and the second cover 62 are made of synthetic resin. The first cover 61 and the second cover 62 are both U-shaped in the plan view, and formed substantially symmetric.

As illustrated in FIG. 4, the first cover 61 has a first cover main body 611 having a substantially plate configuration bended in a U shape. A skirt 612 extended downward (−Z side) while curved toward the inside is provided at the lower end of the first cover main body 611. A hole 613 through which a screw member SC6 is inserted at the time of fixation of the first cover 61 to the fixing portion is formed in the vicinity of each of both ends of the first cover main body 611 on the rear side (−X side).

The second cover 62 is disposed such that the first cover 61 and the second cover 62 are positioned substantially symmetric with respect to the Y-Z plane. As illustrated in FIG. 4, the second cover 62 has a second cover main body 621 having a substantially plate configuration and bended in a U shape. A skirt 622 extended downward (−Z direction) while curved toward the inside is provided at the lower end of the second cover main body 621. A hole 623 through which the screw member SC6 is inserted at the time of fixation of the second cover 62 to the fixing portion is provided in each of the side surfaces of the second cover main body 621 disposed in the left-right direction and extended toward the front (+X side).

A recess 624 recessed from the outer surface toward the inner side is formed at each of both ends of the second cover main body 621 and the skirt 622 on the front side (+X side). The recesses 624 correspond to the portions overlapping with the inner surface side of the first cover 61 when the first cover 61 is positioned in alignment with the second cover 62, and mask the clearance of the joint between the first cover 61 and the second cover 62.

The method for positioning the cover member 60 is now explained.

The cover member 60 is positioned after completion of the position adjustment of the projector 7. The attachment of the cover 60 is carried out after the projection of image light from the projector 7 is stopped.

According to this embodiment, the cover member 60 is fixed to the fixing portion formed on the second plate 20. As illustrated in FIG. 4, the fixing portion is constituted by the two pieces 208 provided at each end of the second plate 20 in the left-right direction (Y-axis direction), and the screw holes 209 formed in the respective pieces 208. Attachment of the cover member 60 is completed by positioning the second cover 62 initially, and subsequently positioning the first cover 61.

For attachment of the second cover 62, both ends of the second cover 62 are shifted from the rear (from the piece 307b of the third plate 30) toward the front (+X side) with respect to the ceiling hanger 1 (first plate 10 through third plate 30) in the manner indicated by an arrow as illustrated in FIG. 12A. When shifted toward the front, the second cover 62 stops at the position where the holes 623 face to the screw holes 209 of the pieces 208 of the second plate 20 on the rear side.

Then, as illustrated in FIG. 12B, the screw members SC6 are inserted into the holes 623 and tightened in engagement with the screw holes 209 of the two pieces 208 opposed thereto on the inner surface side. By this step, the second cover 62 is fixed to (positioned on) the second plate 20 in the left-right direction. After the second cover 62 is positioned, the side surface of the ceiling hanger 1 (first plate 10 through third plate 30) on the rear side and the side surface thereof in the left-right direction approximately on the rear half are covered by the second cover 62.

For attachment of the first cover 61, both ends of the first cover 61 are shifted from the front (from the piece 307a of the third plate 30) toward the rear (−X side) in the manner indicated by an arrow with respect to the ceiling hanger 1 (first plate 10 through third plate 30) as illustrated in FIG. 12C. When shifted toward the rear, the first cover 61 stops at the position where the holes 613 face to the screw holes 209 of the pieces 208 of the second plate 20 on the front side. In this condition, both ends of the first cover 61 overlap with the outer surfaces of the recesses 624 of the second cover 62.

Then, as illustrated in FIG. 12D, the screw members SC6 are inserted into the holes 613 and tightened in engagement with the screw holes 209 of the two pieces 208 opposed thereto on the inner surface side. By this step, the first cover 61 is fixed to (positioned on) the second plate 20 in the left-right direction. After the first cover 61 is positioned, the side surface of the ceiling hanger 1 (first plate 10 through third plate 30) on the front side and the side surface thereof in the left-right direction approximately on the front half are covered by the first cover 61.

By these steps, attachment (fixation) of the cover member 60 to the ceiling hanger 1 (second plate 20) is completed as illustrated in FIG. 12D, FIGS. 1A and 1B, and FIGS. 2A through 2C.

According to this embodiment, the following advantages can be offered.

The ceiling hanger 1 according to this embodiment has the four plates constituted by the first plate 10 through the fourth plate 40, and locates the projector 7 on the ceiling surface S. The first plate 10 and the second plate 20 are positioned on the ceiling surface S. The second plate 20 makes adjustment in the horizontal direction around the first rotation axis A1 having a rotation axis in the up-down direction and produced when the second plate 20 is fitted to the first plate 10. The third plate 30 makes adjustment in the left-right direction around the second rotation axis A2 having a rotation axis in the front-rear direction and produced when the third plate 30 is fitted to the second plate 20. The fourth plate 40 fixes the projector 7 and makes adjustment in the up-down direction around the third rotation axis A3 having a rotation axis in the left-right direction and produced when the fourth plate 40 is fitted to the third plate 30. In this case, the ceiling hanger 1 constituted by the four plates of the first plate 10 through the fourth plate 40 fitted to each other has a reduced thickness. Moreover, the adjustment in the horizontal direction is achieved by the engagement between the first plate 10 and the second plate 20, the adjustment in the left-right direction is achieved by the engagement between the second plate 20 and the third plate 30, and the adjustment in the up-down direction is achieved by the engagement between the third plate 30 and the fourth plate 40. Accordingly, fine adjustment of the position (posture) of the projector 7 in the horizontal direction, left-right direction (inclination in the left-right direction), and up-down direction can be easily and securely made.

According to the ceiling hanger 1 in this embodiment, the first plate 10 has the cylindrical portion 102, while the second plate 20 has the first opening 202. The engagement between the cylindrical portion 102 and the first opening 202 produces the first rotation axis A1. Thus, the first rotation axis A1 can be easily established.

According to the ceiling hanger 1 in this embodiment, the third plate 30 produces the second rotation axis A2 by engagement with the second plate 20 via the screw members SC2. Thus, the second rotation axis A2 can be easily established.

According to the ceiling hanger 1 in this embodiment, the third plate 30 has the holding portions 305, and the fourth plate 40 has the support shafts 404. The engagement between the holding portions 305 and the support shafts 404 produces the third rotation axis A3. Thus, the third rotation axis A3 can be easily established. Moreover, the fourth plate 40 to which the projector 7 is fixed can be easily and securely held on the third plate 30 by the hold of the support shafts 404 on the holding portions 305. Also, the fourth plate 40 can be easily and securely removed from the third plate 30.

According to the ceiling hanger 1 in this embodiment, the third plate 30 has the holding portions 305, and the guides 306 for guiding the support shafts 404 toward the holding portions 305. In this case, the support shafts 404 can be guided to the holding portions 305 by using the guides 306, wherefore the support shafts 404 can be further easily and securely held by the holding portions 305.

According to the ceiling hanger 1 in this embodiment, the step for disposing the support shafts 404 provided on the fourth plate 40 to which the projector 7 is fixed such that the support shafts 404 are held on the holding portions 305 provided on the third plate 30 is performed in a blind manner. However, this blind step can be executed with easy checking of whether the support shafts 404 are located at appropriate positions on the holding portions 305 through the holes 311 (openings) formed in the third plate 30 where the holding portions 305 are provided. Thus, it can be visually checked whether the support shafts 404 are held on the holding portions 305 in an appropriate manner even when the step for disposing the support shafts 404 on the holding portions 305 is performed blindly. Accordingly, the projector 7 can be securely held on the holding portions 305, wherefore the safety of the ceiling hanger 1 increases.

The holes 311 through which whether the support shafts 404 are located at appropriate positions of the holding portions 305 can be checked are considerably advantageous for the ceiling hanger 1 to which the projector 7 is attached in a blind manner due to reduction of the thickness of the ceiling hanger 1. Moreover, the diameters of the holes 311 in this embodiment are made smaller than the diameters of the white members affixed (or applied) to the end surfaces of the support shafts 404. According to this structure, securer determination can be made by checking whether the white members can be visually identified through the holes 311. Thus, maintenance required after the installation can be facilitated.

According to the ceiling hanger 1 in this embodiment, the control in the horizontal direction is performed by rotating the first screw members 106 provided on the first plate 10 around the first rotation axis A1 in abutment with the second plate 20. Thus, fine adjustment in the horizontal direction can be made by controlling the volume of rotation of the first screw members 106. Moreover, the abutment between the first screw members 106 and the second plate 20 prevents positional shift after the adjustment, thereby achieving fixation of the second plate 20 to the first plate 10.

According to the ceiling hanger 1 in this embodiment, the inclination control in the left-right direction is performed by rotating the second screw members 315 provided on the third plate 30 in the left-right direction around the second rotation axis A2 in abutment with the second plate 20. Thus, fine adjustment of inclination in the left-right direction can be made by controlling the volume of rotation of the second screw members 315. Moreover, the abutment between the second screw members 315 and the second plate 20 prevents positional shift after the adjustment, thereby achieving fixation of the third plate 30 to the second plate 20.

According to the ceiling hanger 1 in this embodiment, each of the second screw members 315 has the dial 317 which is rotated by fingers to rotate the second screw member 315. Thus, fine adjustment of inclination in the left-right direction can be accurately made by rotating the second screw members 315 using the dials 317. In addition, the steps required for the adjustment can be carried out with higher efficiency.

According to the ceiling hanger 1 in this embodiment, the third plate 30 is rotated in the left-right direction with respect to the second plate 20 by loosening the screw members SC3 at the time of adjustment in the left-right direction around the second rotation axis A2 by using the second screw members 315. Moreover, the second plate 20 and the third plate 30 are securely fixed to each other by tightening the screw members SC3 after completion of the adjustment in the left-right direction. Also, rough adjustment in the left-right direction before fine adjustment by the second screw members 315 can be made by loosening the screw members SC3. In addition, the abutment between the second screw members 315 and the second plate 20 prevents positional shift after the adjustment and allows the screw members SC3 to be easily fastened after completion of the adjustment without the necessity of caution for preventing positional shift.

According to the ceiling hanger 1 in this embodiment, the control in the up-down direction is performed by rotating the third screw member 325 provided on the third plate 30 around the third rotation axis A3 in abutment with the fourth plate 40. Thus, fine adjustment in the up-down direction can be made by controlling the volume of rotation of the third screw members 325. Moreover, the abutment between the third screw member 325 and the fourth plate 40 prevents positional shift after the adjustment, thereby achieving fixation of the fourth plate 40 to the third plate 30.

According to the ceiling hanger 1 in this embodiment, the third screw member 325 has the dial 327 which is rotated by fingers to rotate the third screw member 325. Thus, fine adjustment in the up-down direction can be accurately made by rotating the third screw member 325 using the dial 327. In addition, the steps required for the adjustment can be carried out with higher efficiency.

According to the ceiling hanger 1 in this embodiment, the fourth plate 40 is rotated in the up-down direction with respect to the third plate 30 by loosening the screw members SC4 at the time of adjustment in the up-down direction around the third rotation axis A3 by using the third screw member 325. Moreover, the third plate 30 and the fourth plate 40 are securely fixed to each other by tightening the screw members SC4 after completion of the adjustment in the up-down direction. Also, rough adjustment in the up-down direction before fine adjustment by the third screw member 325 can be made by loosening the screw members SC4. In addition, the abutment between the third screw member 325 and the fourth plate 40 prevents positional shift after the adjustment and allows the screw members SC4 to be easily fastened after completion of the adjustment without the necessity of caution for preventing positional shift.

According to the ceiling hanger 1 in this embodiment, the cables C are inserted into the cylindrical portion 102, the first opening 202, and the second opening 302, and connected with the projector 7. In this case, the cables C pass through the interior of the ceiling hanger 1 and connect with the projector 7 with the lowest possible conspicuousness from the outside even when the thickness of the ceiling hanger 1 is reduced. Thus, the external appearance of the wiring of the cables C improves. Moreover, a plurality of the cables C can be inserted by enlarging the diameters of the cylindrical portion 102, the first opening 202, and the second opening 302 even when the thickness of the ceiling hanger 1 is reduced.

According to the ceiling hanger 1 in this embodiment, the fourth plate 40 has the clearance securing portions for securing the distance D between the fourth plate 40 and the area around the second opening 302 in the height direction so that the cables C can be extended from the clearance securing portions. In this case, the plural cables C can be guided toward the interface 705 of the projector 7, and connected with the connect unit 706 of the interface 705 with the minimum exposure along the shortest route. Thus, the external appearance of the wiring of the cables C improves.

According to the ceiling hanger 1 in this embodiment, the second opening 302 (opening 302b) is disposed offset toward the side through which the cables C are extended. Thus, the steps for guiding the plural cables C toward the interface 705 of the projector 7 can be carried out with higher efficiency.

According to the ceiling hanger 1 in this embodiment, the cover member 60 covers the side surfaces of the first plate 10, the second plate 20, and the third plate 30 to avoid exposure of the first plate 10, the second plate 20, and the third plate 30 to the outside. Thus, the external appearance of the ceiling hanger 1 improves.

According to the ceiling hanger 1 in this embodiment, the cover member 60 is so sized as to avoid the movable ranges of the second plate 20 through the fourth plate 40 when the respective plates move for the control of the position (posture) of the projector 7 in the horizontal direction, left-right direction, and up-down direction. Thus, the cover member 60 can be positioned without collision with the respective plates after the control. Accordingly, the respective plates can be made invisible even when shifted at the time of adjustment, wherefore the external appearance of the ceiling hanger 1 improves.

According to the ceiling hanger 1 in this embodiment, the cover member 60 covers the components operated for the adjustment so that the components operated for the adjustment become invisible. Thus, the external appearance of the ceiling hanger 1 improves.

According to the ceiling hanger 1 in this embodiment, the cover member 60 provided on the ceiling hanger 1 can prevent adhesion of dust to the first plate 10 through the third plate 30, allowing the external appearance to be maintained. Moreover, the ceiling hanger 1 provided with the cover member 60 can prevent entrance of dust, oil or the like into the components operated for the adjustment, thereby maintaining the position of the projector 7 fixed to the ceiling hanger 1 after the adjustment.

The ceiling hanger 1 provided with the cover member 60 has only a small number of components easily caught during cleaning of the ceiling hanger 1. Thus, the ceiling hanger 1 can be easily and safely cleaned.

According to the ceiling hanger 1 in this embodiment, the cover member 60 has the first cover 61 covering the side surface on the front side, and the second cover 62 covering the side surface on the rear side. The respective covers are fixed to the fixing portion in the left-right direction. In this case, the joint between the first cover 61 and the second cover 62 is located not on the front side or the rear side, but on the left or right side. Moreover, for fixing the respective covers to the fixing portion via the screw members SC6, the positions of the screw members SC6 are located in the left-right direction. Accordingly, the components such as the joint and the screw members SC6 which may deteriorate the external appearance are disposed in the left-right direction, wherefore the external appearance on the front side and the rear side can improve.

According to the ceiling hanger 1 in this embodiment, the cover member 60 is positioned after completion of the position control of the projector 7. At the time of positioning of the cover member 60, projection of image light from the projector 7 is stopped. When attachment of the cover member 60 is carried out without stopping projection of image light, a higher level of safety can be secured in the structure which provides fixation using the screw members SC6 in the left-right direction as in this embodiment than in such a structure which fixes the screw members SC6 on the front side (projection lens 702 side), for example. Moreover, when the fixation via the screw members SC6 is conducted in the left-right direction, the cover member 60 can be more easily fixed with less interference with the respective cables C than in such a structure which achieves fixation via the screw members SC6 on the rear side, for example.

According to the ceiling hanger 1 in this embodiment, the cover member 60 is made of synthetic resin. In this case, the processability of the cover member 60 increases. In addition, the degree of freedom in designing the cover member 60 improves.

The invention is not limited to the embodiment described herein, but may be practiced otherwise with various changes and improvements without departing from the scope of the invention. For example, the following modifications may be made.

According to the ceiling hanger 1 in this embodiment, the range of the fine adjustment includes the horizontal direction, left-right direction, and up-down direction. However, the range of the fine adjustment is not limited to these directions but may be arbitrarily determined.

According to the ceiling hanger 1 in this embodiment, the first plate 10 has the cylindrical portion 102, and the second plate 20 has the first opening 202, so that the first rotation axis A1 can be produced by the engagement between the cylindrical portion 102 and the first opening 202. However, the first rotation axis may be established by forming the opening (first opening) in the first plate 10, and the cylindrical portion on the second plate 20.

According to the ceiling hanger 1 in this embodiment, the support shafts 404 are provided on the fourth plate 40 in the left-right direction, while the holding portions 305 holding the support shafts 404 are provided on the third plate 30, so that the third rotation axis A3 can be produced by the engagement between the support shafts 404 and the holding portions 305. However, the third rotation axis may be established by forming the support shafts on the third plate 30 in the left-right direction, and the holding portions on the fourth plate 40 for holding the support shafts.

According to the ceiling hanger 1 in this embodiment, the first screw members 106 are provided on the first plate 10 (with engagement between the first screw members 106 and the screw holes 105 of the first plate 10). The screw tips of the first screw members 106 abut the second plate 20 for the control in the horizontal direction. However, the first screw members may be provided on the second plate 20, and the screw tips of the first screw members may abut the first plate 10 for the control in the horizontal direction.

According to the ceiling hanger 1 in this embodiment, the second screw members 315 are provided on the third plate 30. The second screw members 315 abut the second plate 20 for the control in the left-right direction. However, the second screw members may be provided on the second plate 20, and abut the third plate 30 for the control in the left-right direction.

According to the ceiling hanger 1 in this embodiment, the screw holes 207a (screwing portions) engaging with the screw members SC3 are formed in the second plate 20, and the long holes 309a for guiding the screw members SC3 are formed in the third plate 30. However, the screw holes engaging with the screw members may be formed in the third plate 30, and the long holes for guiding the screw members may be formed in the second plate 20.

According to the ceiling hanger 1 in this embodiment, the third screw member 325 is provided on the third plate 30, and abuts the fourth plate 40 for the control in the up-down direction. However, the third screw member may be disposed on the fourth plate 40 and abut the third plate 30 for the control in the up-down direction.

According to the ceiling hanger 1 in this embodiment, the screw holes 312 (screwing portions) engaging with the screw members SC4 are formed in the third plate 30, and the long holes 408 for guiding the screw members SC4 are formed in the fourth plate 40. However, the screw holes engaging with the screw members may be formed in the fourth plate 40, and the long holes for guiding the screw members may be formed in the third plate 30.

According to the ceiling hanger 1 in this embodiment, the white members for checking are affixed (or applied) to the end surfaces of the support shafts 404 provided on the fourth plate 40. However, the color of the white members is not limited to white but may be other colors.

According to the ceiling hanger 1 in this embodiment, the clearance securing portions are provided on the rear side (−X side) where the cables C are extended (where the interface 705 of the projector 7 is disposed). However, the clearance securing portions are not required to be disposed on the rear side but may be located on any side where the interface 705 of the projector 7 is positioned.

According to the ceiling hanger 1 in this embodiment, the second opening 302 is disposed offset toward the rear side (−X side) where the cables C are extended (where the interface 705 of the projector 7 is disposed). However, the second opening 302 is not required to be disposed on the rear side but may be located offset toward any side where the interface 705 of the projector 7 is positioned.

According to the ceiling hanger 1 in this embodiment, the cover member 60 covers the side surfaces of the first plate 10, the second plate 20, and the third plate 30. However, the cover member 60 may cover the fourth plate 40 as well.

According to the ceiling hanger 1 in this embodiment, fixing portion to which the cover member 60 is fixed is provided on the second plate 20. However, the fixing portion may be located on any of the first plate 10 through the fourth plate 40.

According to the ceiling hanger 1 in this embodiment, the cover member 60 is divided into the first cover 61 and the second cover 62. However, the cover member 60 may be divided into three or more parts.

According to the ceiling hanger 1 in this embodiment, the cover member 60 is made of synthetic resin. However, the cover member 60 may be made of other material such as metal. Alternatively, the cover member 60 may be wooden.

According to the ceiling hanger 1 in this embodiment, the cover member 60 is fixed to the fixing portion via the screw members SC6. However, the cover member 60 is not required to be fixed by using the screw members SC6, but may be secured by other methods such as engagement between the cover member 60 and the fixing portion.

What is claimed is:

1. A ceiling hanger for a projector, comprising:
a first plate fixed to a ceiling surface;
a second plate positioned on the ceiling surface together with the first plate, wherein the second plate forms a first rotation axis having a rotation axis in an up-down direction, and allows control in a horizontal direction around the first rotation axis, the second plate including first and second members extending in the up-down direction;

a third plate mounted to the first and second members of the second plate, a second rotation axis, having a rotation axis in a front-rear direction after being fitted to the second plate, extending through a portion of the first and second members and the third plate, and allowing control in a left-right direction around the second rotation axis, the third plate include a holding portion extending in the up-down direction, the holding portion including a recess open in the up-down direction; and a fourth plate fixed to the projector, the fourth plate including a member extending in the up-down direction and a support shaft which is held in the recess to suspend the fourth plate from the third plate with the member extending through a main body member of the third plate in the up-down direction after the fourth plate is fitted to the third plate, the support shaft forming a third rotation axis having a rotation axis in the left-right direction after being fitted to the third plate, and allowing control in the up-down direction around the third rotation axis.

2. The ceiling hanger according to claim 1, wherein:
the first plate has either one of a cylindrical portion and an opening;
the second plate has the other of the cylindrical portion and the opening; and
the first plate and the second plate having the one and the other of the cylindrical portion and the opening, respectively, produce the first rotation axis.

3. The ceiling hanger according to claim 1, wherein the third plate produces the second rotation axis via a screw member.

4. The ceiling hanger according to claim 1, wherein the third plate has an opening, wherein a position of the support shaft held by the holding portion can be viewed through the opening.

5. The ceiling hanger according to claim 1, wherein:
either one of the first plate and the second plate has a first screw member disposed substantially perpendicular to the first rotation axis; and
a control in the horizontal direction is carried out by rotating the first screw member provided on the one plate in abutment with the other plate.

6. The ceiling hanger according to claim 1, wherein:
either one of the second plate and the third plate has a second screw member positioned substantially perpendicular to the second rotation axis; and
a control in the left-right direction is carried out by rotating the second screw member provided on one of either one of the second plate and the third plate in abutment with the other of either one of the second plate and the third plate.

7. The ceiling hanger according to claim 1, further comprising:
a screw member which fixes the second plate and the third plate,
wherein
either one of the second plate and the third plate has a screwing portion formed substantially in parallel with the second rotation axis and engaging with the screw member, and
the other of the second plate and the third plate has a long hole formed around the second rotation axis and guiding the screw member.

8. The ceiling hanger according to claim 1, wherein:
either one of the third plate and the fourth plate has a third screw member disposed substantially perpendicular to the third rotation axis; and
a control in the up-down direction is carried out by rotating the third screw member provided on one of either one of the third plate and the fourth plate in abutment with the other of either one of the third plate and the fourth plate.

9. The ceiling hanger according to claim 1, further comprising:
a screw member which fixes the third plate and the fourth plate,
wherein
either one of the third plate and the fourth plate has a screwing portion formed substantially in parallel with the third rotation axis and engaging with the screw member, and
the other of the third plate and the fourth plate has a long hole formed around the third rotation axis and guiding the screw member.

10. The ceiling hanger according to claim 1, wherein:
the first plate has either one of a cylindrical portion and a first opening which receives insertion of the cylindrical portion, the second plate has the other of the cylindrical portion and the first opening, so that the first plate and the second plate having one and the other of the cylindrical portion and the first opening, respectively, produce the first rotation axis;
the third plate has a second opening in an area opposed to the first opening; and
a cable connected with the projector is inserted through the cylindrical portion, the first opening, and the second opening.

11. The ceiling hanger according to claim 10, wherein the fourth plate has a clearance securing portion provided in an area where the cable is extended to secure a clearance between the fourth plate and a surroundings of the second opening in a height direction.

12. The ceiling hanger according to claim 11, wherein the second opening is disposed offset toward an area where the cable is extended.

13. The ceiling hanger according to claim 1, wherein the third plate has a guide which guides the support shaft toward the holding portion.

14. The ceiling hanger according to claim 1, wherein a cover member which covers side surfaces of the first plate, the second plate, and the third plate is disposed between the ceiling surface and the projector fixed to the fourth plate.

15. The ceiling hanger according to claim 14, wherein the cover member is so sized as to avoid a movable range of the second plate, the third plate, and the fourth plate for control.

16. The ceiling hanger according to claim 14, wherein the cover member covers a component operated at a time of control.

17. The ceiling hanger according to claim 14, wherein:
any of the first plate through the fourth plate has a fixing portion which fixes the cover member;
the cover member has a first cover covering side surfaces on the front side, and a second cover covering the side surfaces on the rear side; and
the first cover and the second cover are arranged in the left-right direction and fixed to the fixing portion.

18. The ceiling hanger according to claim 14, wherein the cover member is made of synthetic resin.

* * * * *